US008353772B2

(12) United States Patent
Callery et al.

(10) Patent No.: US 8,353,772 B2

(45) Date of Patent: Jan. 15, 2013

(54) SYSTEM AND METHOD FOR CONDUCTING A FANTASY SPORTS COMPETITION

(75) Inventors: Brian Callery, Rockville, MD (US); Kevin M. Lanik, Rockville, MD (US); Charles D. Boyd, Silver Spring, MD (US)

(73) Assignee: Fantasy Weekly, LLC, Rockville, MD (US)

( * ) Notice: Subject to any disclaimer, the term of this patent is extended or adjusted under 35 U.S.C. 154(b) by 1073 days.

(21) Appl. No.: 12/120,491

(22) Filed: May 14, 2008

(65) Prior Publication Data

US 2008/0287198 A1 Nov. 20, 2008

Related U.S. Application Data

(60) Provisional application No. 60/938,056, filed on May 15, 2007.

(51) Int. Cl.
*A63F 13/00* (2006.01)

(52) U.S. Cl. .......................................................... 463/42

(58) Field of Classification Search ................ 463/4, 40, 463/42; 273/317.1

See application file for complete search history.

(56) References Cited

U.S. PATENT DOCUMENTS

| | | | | |
|---|---|---|---|---|
| 4,918,603 | A | 4/1990 | Hughes et al. | |
| 5,846,132 | A | 12/1998 | Junkin | |
| 5,971,854 | A | 10/1999 | Pearson et al. | |
| 6,193,610 | B1 | 2/2001 | Junkin | |
| 6,371,855 | B1 * | 4/2002 | Gavriloff | 463/42 |
| 6,656,042 | B2 | 12/2003 | Reiss et al. | |
| 7,001,279 | B1 | 2/2006 | Barber et al. | |
| 2002/0034980 | A1 | 3/2002 | Lemmons et al. | |
| 2002/0107073 | A1 | 8/2002 | Binney | |
| 2002/0115488 | A1 | 8/2002 | Berry et al. | |
| 2002/0115489 | A1 | 8/2002 | Jordan et al. | |
| 2003/0195805 | A1 * | 10/2003 | Storey | 705/14 |
| 2004/0110552 | A1 | 6/2004 | Del Prado | |
| 2004/0204217 | A1 | 10/2004 | Herman | |
| 2004/0266530 | A1 * | 12/2004 | Bishop | 463/42 |
| 2005/0049731 | A1 * | 3/2005 | Dell | 700/91 |
| 2005/0116422 | A1 | 6/2005 | Fish | |

(Continued)

OTHER PUBLICATIONS

"Introducing SnapDraft", by Seth Trachtman, www.rotoworld.com/printarticle.html, Nov. 20, 2009.*

(Continued)

*Primary Examiner* — David L Lewis
*Assistant Examiner* — Eric M Thomas
(74) *Attorney, Agent, or Firm* — Edell, Shapiro & Finnan, LLC

(57) ABSTRACT

The present invention embodiments pertain to conducting fantasy sports or other competitions, where users select or draft an entirely new team of professional players each week (or at other suitable time interval). The competition types (including playoffs) include fee based and free. Each fee based competition has a pre-determined entry fee, and prizes are awarded to the winner of that competition each week. The free competitions similarly include weekly prizes and further provide for a grand prize. Within each of the free and fee based types of competitions, users may compete in a "private" competition or a randomly composed "open" competition. Users within the free and fee based competitions may accumulate points that qualify for redemption to obtain prizes. These points are accumulated based upon the statistical performance of the drafted players for each team. The present invention embodiments further provide mechanisms for information sharing and interaction between users.

35 Claims, 26 Drawing Sheets

U.S. PATENT DOCUMENTS

| | | | | |
|---|---|---|---|---|
| 2005/0159220 | A1 | 7/2005 | Wilson et al. | |
| 2006/0100006 | A1 | 5/2006 | Mitchell et al. | |
| 2006/0105827 | A1 | 5/2006 | Metzger et al. | |
| 2006/0183547 | A1 * | 8/2006 | McMonigle | 463/40 |
| 2006/0217198 | A1 | 9/2006 | Johnson | |
| 2007/0060380 | A1 * | 3/2007 | McMonigle et al. | 463/42 |
| 2007/0129123 | A1 * | 6/2007 | Eryou et al. | 463/1 |
| 2008/0200254 | A1 * | 8/2008 | Cayce et al. | 463/42 |

OTHER PUBLICATIONS

"Playoff Fantasy Football Game", www.rotoworld.com/printarticle.html, Jan. 9, 2009.*

"Fantasy sports become a gambling reality", http://www.standard.net/topics/sports/2010/09/26/fantasy-sports-become-gambling-reality, Sep. 26, 2009.*

"Fantasy Sports Live", https://www.fantasysportslive.com/faq.html,

"Rotoworld Introduces snapdraft.com", http://snapdraft.rotoworld.com.*

Football Outsiders Tackling Football from Outside the Hashmarks, Football Outsiders, Inc. www.footballoutsiders.com/ramblings.php?p=249&cat=1.

Playoff Commissioner Service, RealTime Fantasy Sports, Inc. 2006. www.rtsports.com/htm/playoff_features.shtml.

Full Season Commissioner Features, RealTime Fantasy Sports, Inc. 2007. www.rtsports.com/htm/full_season_features.shtml.

"About Takkle", www.Takkle.com/about, retrieved from Internet Apr. 12, 2007.

"Instant Fantasy Sports", www.instantfantasysports.com, retrieved from Internet May 7, 2008.

"WeeklyFantasyGames.com", www.weeklyfantasygames.com, retrieved from Internet May 7, 2008.

"Draftmix.com", www.draftmix.com/help/about_us, reitrieeved from Internet May 7, 2008.

* cited by examiner

SYSTEM AND METHOD FOR CONDUCTING A FANTASY SPORTS COMPETITION

CROSS-REFERENCE TO RELATED APPLICATIONS

This application claims priority from U.S. Provisional Patent Application Ser. No. 60/938,056, entitled "System and Method for Conducting a Fantasy Sports Competition" and filed May 15, 2007, the disclosure of which is incorporated herein by reference in its entirety.

BACKGROUND

1. Technical Field

The present invention embodiments pertain to conducting fantasy sports or other competitions. In particular, the present invention embodiments pertain to conducting fantasy sports or other competitions by providing selection of new teams at the expiration of various time intervals (e.g., a week, a day, etc., and preferably less than the duration of a sports season), where users may selectively participate in free and fee based competitions to accumulate points and earn cash and/or merchandise type rewards.

2. Discussion of Related Art

Fantasy sports leagues provide a manner for the average sports fan to participate in their preferred sport in the role of a virtual general manager. Basically, league participants initially organize a fantasy sports league (with friends or other associates) and draft or select players for their fantasy team in accordance with a participant approved selection scheme, typically similar to the manner professional sports leagues conduct player drafts. A popular type of drafting scheme for fantasy sports leagues includes "dynasty" type leagues, where participants maintain a predetermined amount of their team players over the course of a few seasons, and may further draft new players. In addition, "auction" type fantasy sports leagues provide league participants with a certain monetary value, where each professional player eligible for selection by a participant is assigned a salary. The league participants may allocate the provided money towards player selection in any suitable manner that produces the requisite amount of players for each player position on the participant sports team.

Once the draft process has been completed for the fantasy sports league, each participant has a team of their selected players. The results for a fantasy sports league are based upon individual statistical results from the particular sport. For example, with respect to a fantasy football league, league participants each draft professional football players onto their team for different positions (e.g., quarterback, running back, wide receiver, tight end, kicker, defense, reserve players, etc.). The number and assortment of different players on a participant team is predetermined and approved by the league participants prior to commencement of the fantasy sport season.

Once the sport season begins, the drafted players of the fantasy teams compete in actual games of their sport. The player individual statistics for each game is converted into fantasy points in a predefined manner agreed upon by the league participants. There are generally two types of fantasy scoring systems. A head-to-head type system enables a participant to compete (or "play") against another participant team in a given week. The fantasy team that accumulates the most points in the week based on drafted player performance in actual games is awarded a victory, where the quantity of victories during the fantasy season determines "playoff" qualifications and seeding.

At the conclusion of the fantasy "regular" season, fantasy sports teams in the league may qualify for the "playoffs". In this scenario, the fantasy teams compete in a head-to-head manner as described above with the winning teams advancing to a subsequent round to compete against each other, while losing teams are eliminated. The winning team of this elimination tournament is deemed the winner of the fantasy sports league.

Another type of fantasy scoring system is based upon cumulative points earned by participant sports teams. In particular, each participant team in the fantasy sports league accumulates points based upon the performance of drafted players as described above. Once the sport season is completed, the fantasy sports team that has accumulated the most total points is deemed the winner of the fantasy sports league.

During the fantasy sports season, participants are generally allowed to trade, add and drop players to their team in order to improve the team. Since only one draft is conducted during the fantasy sports season, a participant team is built through the draft at the beginning of the fantasy sports season. If a drafted player does not participate in the actual sporting event (e.g., injured, traded, released, etc.), the participant must adjust the team roster accordingly. These types of events can be catastrophic for a league participant. For example, when a participant first round draft selection becomes seriously injured early in the fantasy sports season, the chances for the participant to succeed in the fantasy sports league are greatly diminished.

SUMMARY

The present invention embodiments pertain to a system and method of conducting fantasy sports or other competitions, where users select or draft an entirely new team of professional players each week (or at other suitable time intervals (e.g., day, session, etc.) preferably less than the duration of the corresponding sports season). The competition types (including post season or playoff competitions) include fee based and free (non-fee based). The fee based and free types of competitions operate in substantially the same manner; however, users within the fee based type competitions pay a pre-set entry fee to play against remaining users within that type of competition. Each fee based competition has a predetermined entry fee, and prizes are awarded to the winner of that competition each week. The free competitions similarly include weekly prizes and further provide for a grand prize.

Within each of the free and fee based types of competitions, users may compete in a "private" competition or league (e.g., a competition among familiar users), or a randomly composed public or "open" competition (or league) including users placed into a competition on a weekly basis. A private competition includes a Commissioner or organizer that invites known users to join the competition, while a public competition is open to any user. The users selectively participate each week and compete against remaining users in the same competition type (free or fee based) on an aggregate basis (e.g., the user with the most total points wins for that week). Users within the free and fee based competitions may accumulate points that qualify for redemption to obtain prizes. These points are accumulated based upon the statistical performance of the drafted players for each team. Several competitions of the free and fee based types may be concurrently conducted during the course of a fantasy sports season, where these competitions typically include different groups of users.

Users may compete in free weekly competitions, weekly competitions for prizes and weekly competitions for cash. In these types of competitions, only the point total from the corresponding team is maintained after the week (e.g., not the team itself) for use in the prize shop. This point total further counts toward the grand prize for the free competitions. In this case, a grand prize is awarded to the users accumulating the most total points throughout the entire fantasy sports season. The users do not need to compete each week to be eligible for the grand prize (in the free competitions) or the prize shop. In addition, prizes may be awarded on a weekly basis to the users accumulating the most points during that week.

Further, the present invention embodiments provide a playoff competition (including free, fee based, open and private competitions) at the conclusion of the regular season that allows users to draft players for the entire playoffs or post season, and compete for cash or a secondary prize at the conclusion of the playoffs. As sports teams are eliminated from actual post season competition, the drafted players from those eliminated teams are removed from the corresponding fantasy teams. The lowest scoring user teams are eliminated on a weekly basis until there is a winner. The present invention embodiments may be utilized with any suitable sports or competitions.

In addition, the present invention embodiments enable users to post messages to message forums and to post a blog to a user blog page. Further, each user account page may be customized based upon user preferences (e.g., highlighting characteristics, uploading images, music and information, etc.). Further, the present invention embodiments enable users to associate with other users (or teammates). This provides users for private competitions a manner to communicate via social networking and messaging components of the present invention embodiments. The database of registered users may be searched (for potential teammates and other registered users) based upon a number of different search criteria.

The present invention embodiments provide several advantages. In particular, the present invention embodiments are configured to provide a new season at predetermined time intervals (e.g., a user can participate in fantasy sports competitions on a weekly basis, etc.). Users can organize a private competition between friends, or can register for an open competition between other random users (e.g., on a weekly basis, etc.). Once a user has registered for a competition, the user participates in a draft for that specific week. Drafting of substitute players is not needed since the draft occurs before each game. Therefore, the user can consider various factors (e.g., injury reports, team match-ups, the upcoming week game-plan, etc.) when determining a draft selection for that specific week, thereby significantly changing the competition. For example, a top rated professional running back may be listed as doubtful for a game against a team with a highly rated rushing defense. In this case, selection of the running back is likely to provide adverse effects in the competition. On the other hand, a mediocre rated professional running back may be healthy for a game in the home stadium against a team with a poorly rated rushing defense. Even though the higher rated running back may have a higher value over the course of a season, the value of the lower rated running back is much higher for this specific week due to the above circumstances. Accordingly, the lower rated running back should probably be selected earlier in this weekly draft.

The present invention embodiments enable a new level of strategy to be employed in fantasy sports competitions, where luck is minimized since early season injuries of professional players have minimal effect on the fantasy sports season. In addition, the present invention embodiments enable a user to selectively participate in weekly competitions without affecting eligibility for cash prizes, the grand prize and the prize shop. This is especially advantageous when users are unable to fulfill a full season commitment.

The above and still further features and advantages of the present invention will become apparent upon consideration of the following detailed description of example embodiments thereof, particularly when taken in conjunction with the accompanying drawings wherein like reference numerals in the various figures are utilized to designate like components.

BRIEF DESCRIPTION OF THE DRAWINGS

FIG. 20 is a schematic illustration of an example graphical user interface for providing message boards according to an embodiment of the present invention.

DETAILED DESCRIPTION OF EXAMPLE EMBODIMENTS

The present invention embodiments provide fantasy sports or other types of competitions. The fantasy sports competitions (including post season or playoff competitions) may be fee based or free (non-fee based). The fee based and free competitions operate in substantially the same manner; however, users participating in the fee based competitions pay a pre-set entry fee to play against remaining users in that type of competition. Each fee based competition has a pre-determined entry fee, and prizes (e.g., cash, merchandise, gift cards, etc.) are awarded to the winner of that competition for each week. The free competitions may similarly include a weekly prize and may further provide for a grand prize. Users of the free and fee based competitions may accumulate points that qualify for redemption in a “prize shop” as described below. Each of the free and fee based competitions include open and private competitions as described below. Several competitions of the free and fee based types may be concurrently conducted during the course of a fantasy sports season, where these competitions typically include different groups of users.

Figure 1:
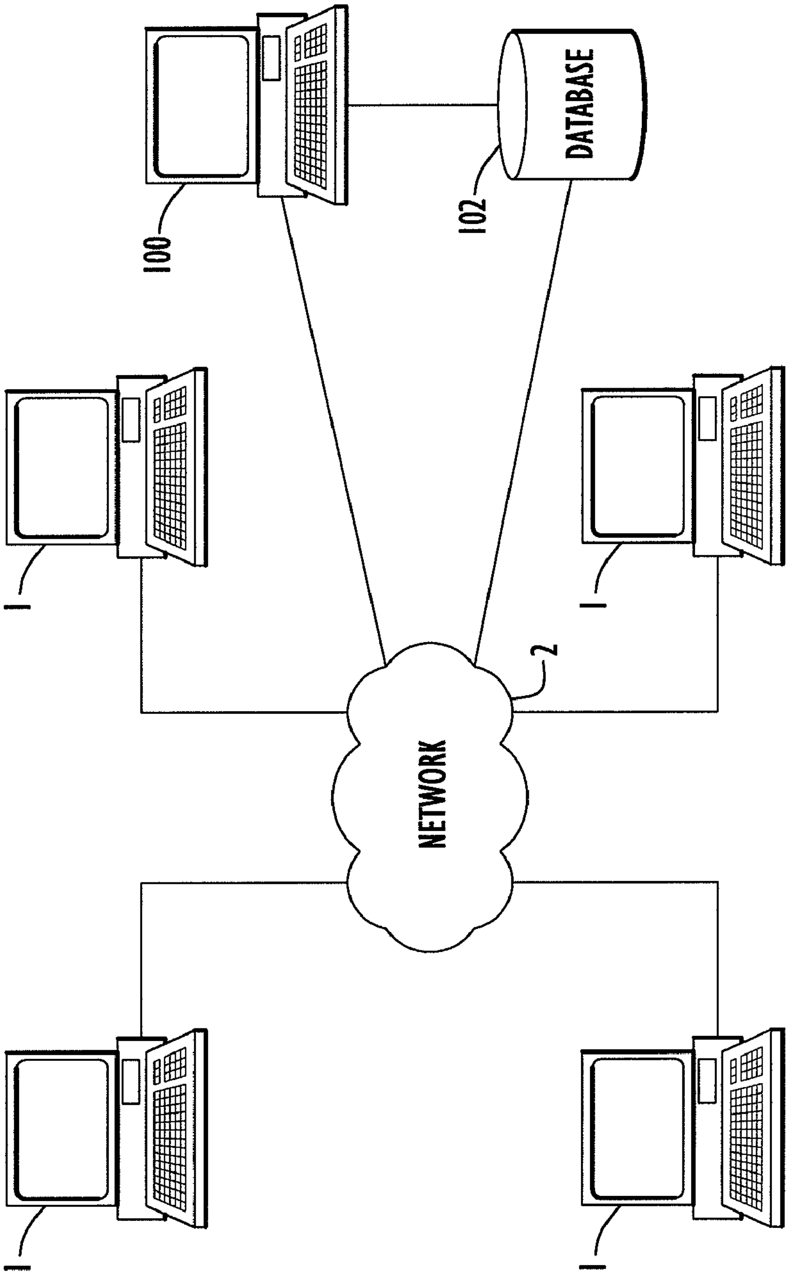
FIG. 1 is a diagrammatic illustration of an example topology employed by an embodiment of the present invention for conducting fantasy sports competitions.

An example network topology employed by a present invention embodiment for conducting fantasy sports or other competitions is illustrated in FIG. 1. Specifically, the network topology includes one or more end-user or client systems 1, a network 2, a server computer system 100, and one or more databases 102. The end-user computer systems are typically implemented by conventional personal or other suitable computer systems preferably equipped with display or monitor, a base (e.g., including the processor memories and internal or external communications devices (e.g., modem, network cards, etc.)), a keyboard and optional mouse or other input device. End-user systems 1 each include software (e.g., operating system, Internet browser, etc.) to communicate with server system 100, and appropriate components (e.g., processor, disk storage or hard drive, etc.) having sufficient processing and storage capabilities to effectively execute the software. The end-user systems may utilize any of the major platforms (e.g., Linux, Macintosh, Unix, OS2, Windows, etc.).

End-user systems 1 are coupled to server system 100 via network 2, while the server system may be coupled to database 102 or access the database over the network. The database may be implemented by any conventional or other suitable storage unit or structure (e.g., database, file system, files, etc.) and stores user and/or system information. Server system 100 is typically implemented by a conventional personal or other suitable computer system preferably equipped with a display or monitor, a base (e.g., including the processor, memories and internal or external communication devices (e.g., modem, network cards, etc.)), a keyboard and optional mouse or other input device. The server system includes software (e.g., operating system, server software, fantasy sports competition software, etc.) to communicate with end-user systems 1 and process requests, and appropriate components (e.g., processor, disk storage or hard drive, etc.) having sufficient processing and storage capabilities to effectively execute the server and fantasy sports competition software. The server system may utilize any of the commercially available operating systems and/or server software.

Network 2 may be implemented by any quantity of any suitable communications media (e.g., WAN, LAN, Internet, Intranet, etc.). End-user systems 1 and server system 100 may be local to or remote from each other. The server system handles user requests from end-user systems 1 and basically implements, under software control, the fantasy sports competition system of the present invention embodiments for conducting fantasy sports or other competitions as described below. The fantasy sports system preferably includes a web site with a plurality of various web or other pages as described below, where end-user systems 1 enable users to interact with, and participate in fantasy sports or other competitions conducted by, server system 100. The various pages may include links, buttons and/or other actuators that users may actuate (e.g., click-on or otherwise actuate with any suitable input devices) to initiate desired actions as described below. However, the fantasy sports system may be implemented in any suitable manner or include any suitable interfaces to interact with the users (e.g., as a stand-alone system, etc.).

The fantasy sports system includes a social networking component or module that enables a user to display personal information in order to link with other users, and to create a profile that provides information about the user. The profile is initially configured by the user and may display various information (e.g., name, age, gender, hometown, schools attended, favorite team, favorite player, occupation etc.). The profile provides a link (e.g., an “About Me” link) to enable the user to select information for display. An account page (e.g., a “My Account” page) enables the user to edit the profile. The social networking component further enables a user to add music and pictures to their profile for other users to view as described below.

Figure 2:
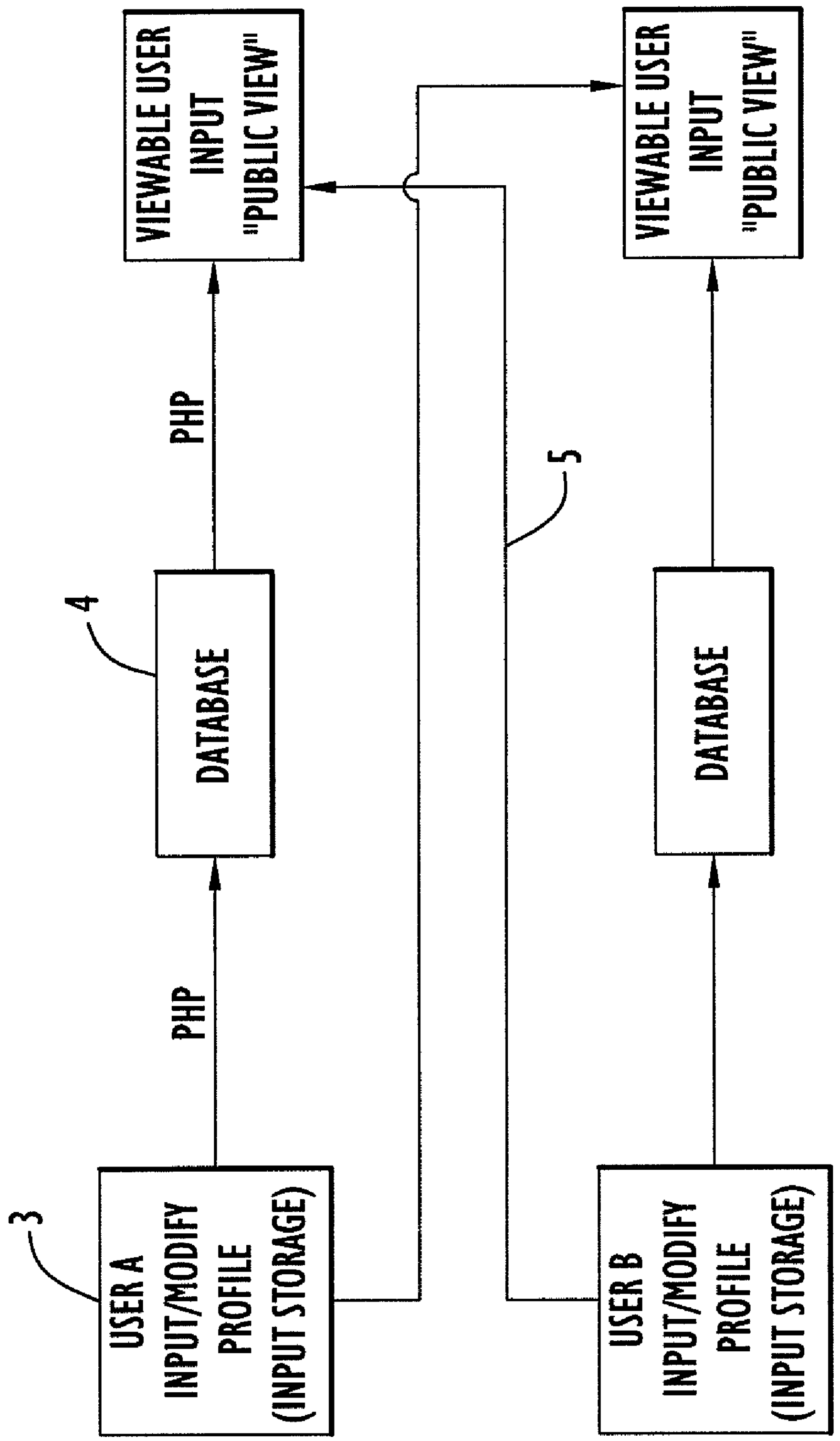
FIG. 2 is a flow diagram illustrating the manner in which personal profiles are created and edited according to an embodiment of the present invention.
Figure 16:
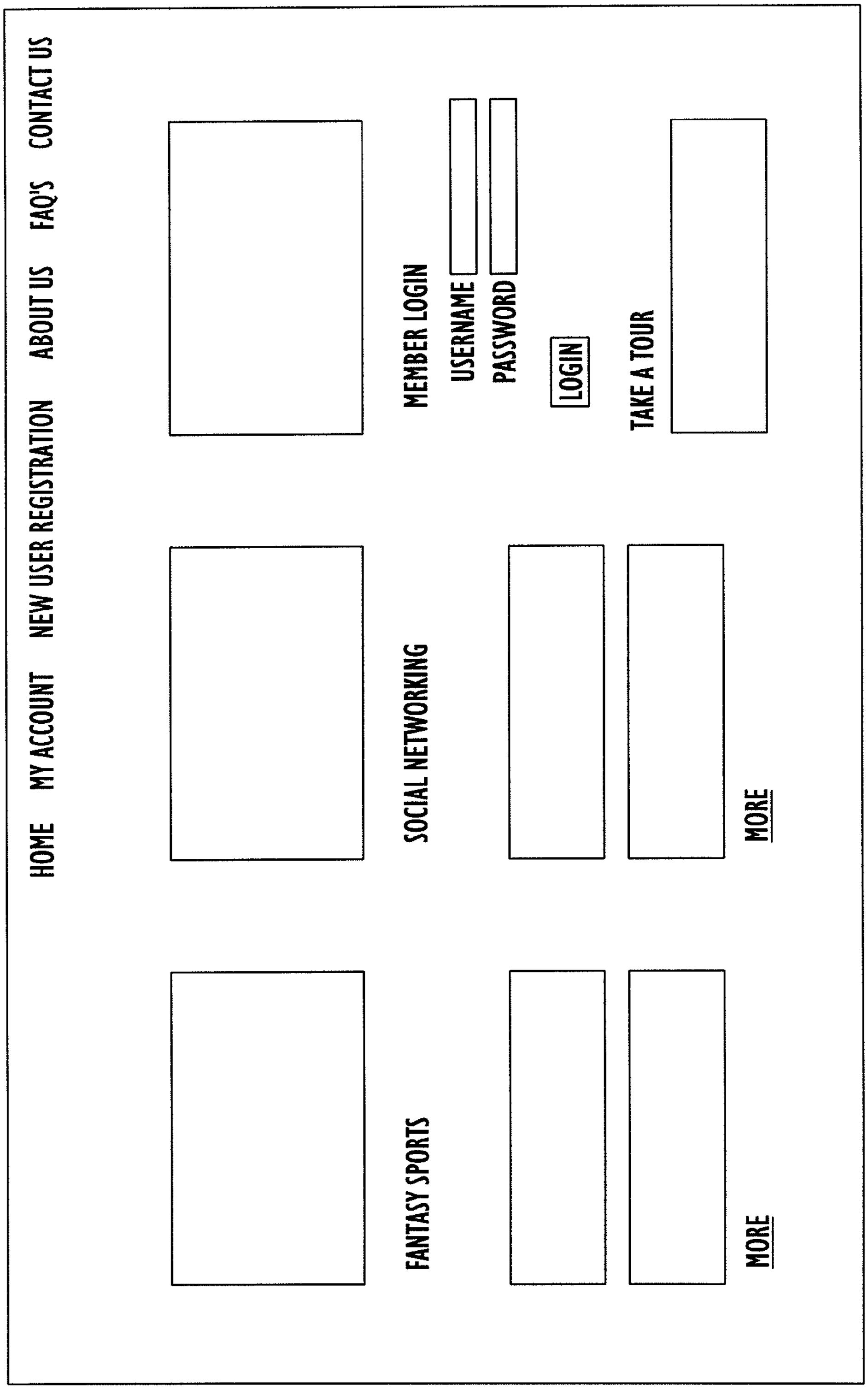
FIG. 16 is a schematic illustration of an example graphical user interface for accessing user accounts according to an embodiment of the present invention.
Figure 17:
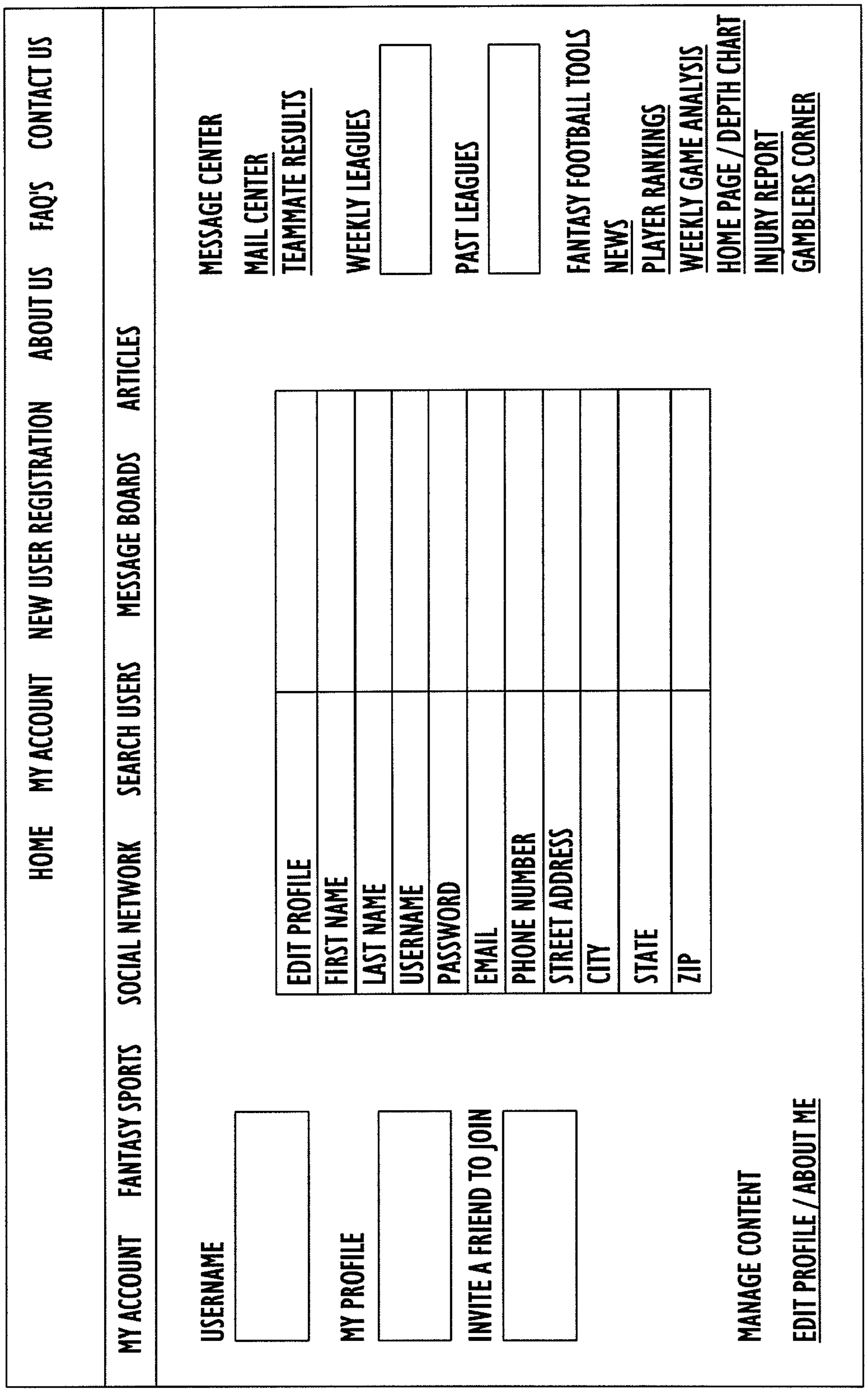
FIG. 17 is a schematic illustration of an example graphical user interface for creating and editing a user profile according to an embodiment of the present invention.

The manner in which the fantasy sports system enables users to create and edit personal profiles is illustrated in FIG. 2. In particular, a user enters certain requested information via a corresponding end-user system to register for an account. Once the account is established, the user subsequently logs into the system under their account from a login page (FIG. 16) for navigation to their account page. The login page includes fields to access the account and links (e.g., “More” links) for ascertaining additional information about the system. The user further actuates a link (e.g., an "Edit Profile" link) from their user account page to access a profile page (FIG. 17) containing the profile. The user enters or changes personal information within the profile to be displayed on the user account page at step 3. The user enters relevant personal information that is stored in database 102 (e.g., a MySQL database) (e.g., via PHP (e.g., PHP: Hypertext Preprocessor) scripting) at step 4. The database is further queried (e.g., via PHP scripting) for the relevant information to display that information on the user public account page at step 5. The public account page is accessible to other users that are logged in the system under their account. For example, user B is connected to the public view account page of user A at step 5 (e.g. as viewed in FIG. 2).

The social networking component or module of the fantasy sports system further enables establishment of linked or associated users (or "teammates") for communication via messaging and message board functions. The linked users may be utilized to organize a fantasy sports competition for a specific week. The association enables a user to link to pages of one or more other users in order to view personal information of those other users. In order for a user to display and link to other users, the user utilizes a link on the user account page to request links to other users (e.g., request another user be a teammate). For example, user A may utilize the link on the corresponding user account page to request that another user B become a teammate of user A. User B may either accept or decline the invitation to become a teammate of user A. If user B accepts the invitation from user A, the username of user B is displayed on the personal account page of user A within a teammate section (viewable by the public). The username of user B is displayed on the personal account page of user A as a link (to the personal account page of user B). Thus, other users viewing the personal account page of user A are informed of the users within the user A network.

Figure 3:
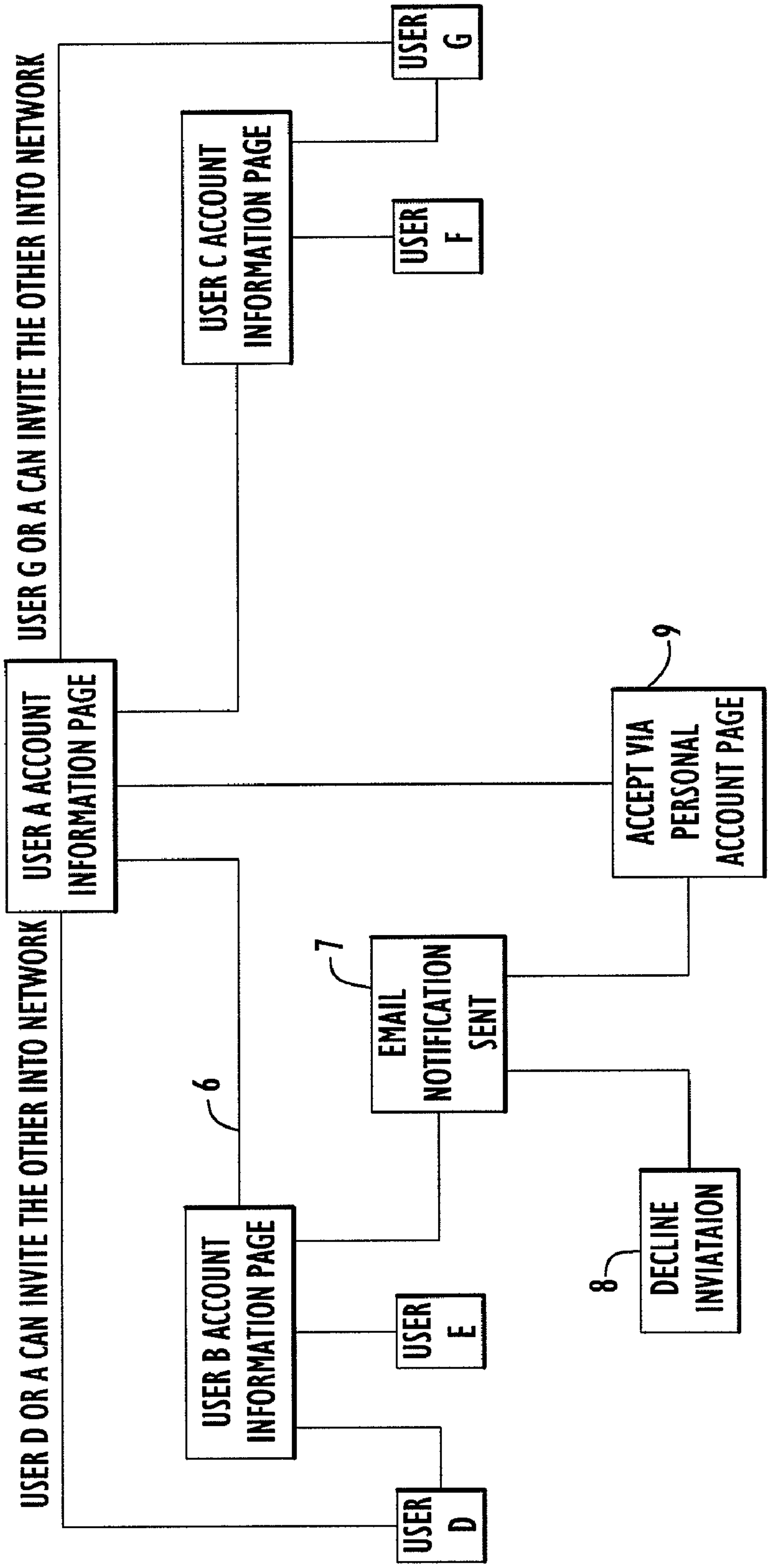
FIG. 3 is a flow diagram illustrating the manner in which a network of links between users is created according to an embodiment of the present invention.

The manner in which a network of links to other user account pages is created by the fantasy sports system is illustrated in FIG. 3. Specifically, user A accesses the public view account page of another user B and actuates a link to add that user B as a teammate (e.g., as viewed in FIG. 3) at step 6. User B receives notification via electronic mail (e-mail), and a notice on their personal account page that user A has requested to add user B to the user A network of teammates at step 7. User B may subsequently accept or decline this request. If user B declines the request, no further action is pursued and user B is not added to the user A network of teammates at step 8. When user B accepts the request to become a teammate of user A, a link is created on the public view account pages of user A and user B to link these account pages together at step 9. Thus, user A and user B belong to each others network. Other users (e.g., users D and E) accessing these account pages are informed that user B and user A are part of each others network of teammates. This process can be repeated by users (e.g., users A, B, C) to add other users (e.g., users D, E, F, G) to their network. The teammate information is stored in the database and displayed (e.g., via PHP scripting). A user may be associated with any quantity of other users or teammates.

The social networking component of the fantasy sports system further includes a search component or module to enable a user to search database 102 for other users based on any information in their corresponding user profiles (e.g., name, age, gender, hometown, schools attended, favorite team, favorite player, occupation etc.) in order to create a network of teammates. The searching provides links to the profile pages of the users uncovered during the search and displayed based on the search criteria to enable browsing of the user profile page from the search results.

Figure 4:
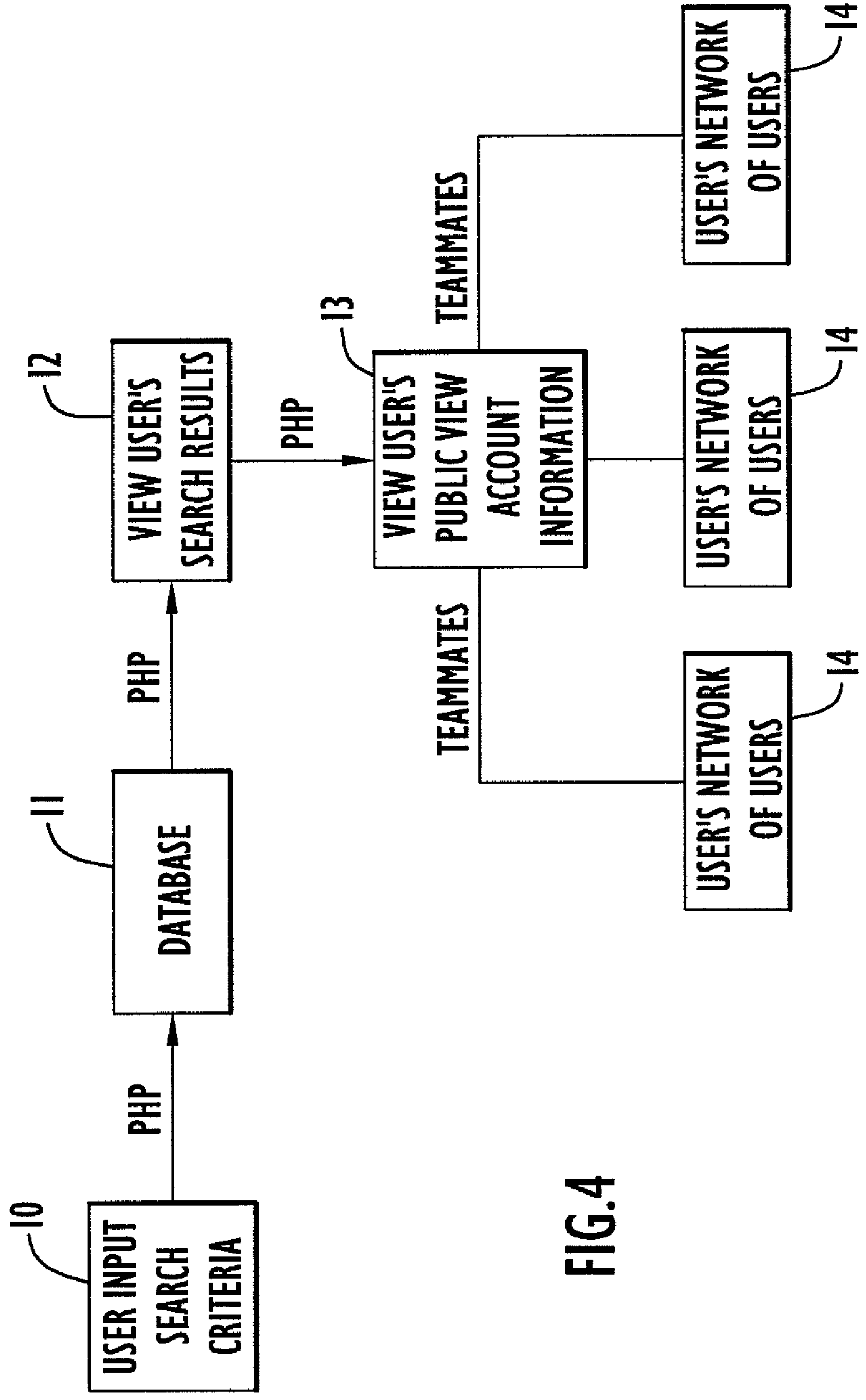
FIG. 4 is a flow diagram illustrating the manner in which system users are searched based on various search criteria according to an embodiment of the present invention.
Figure 18:
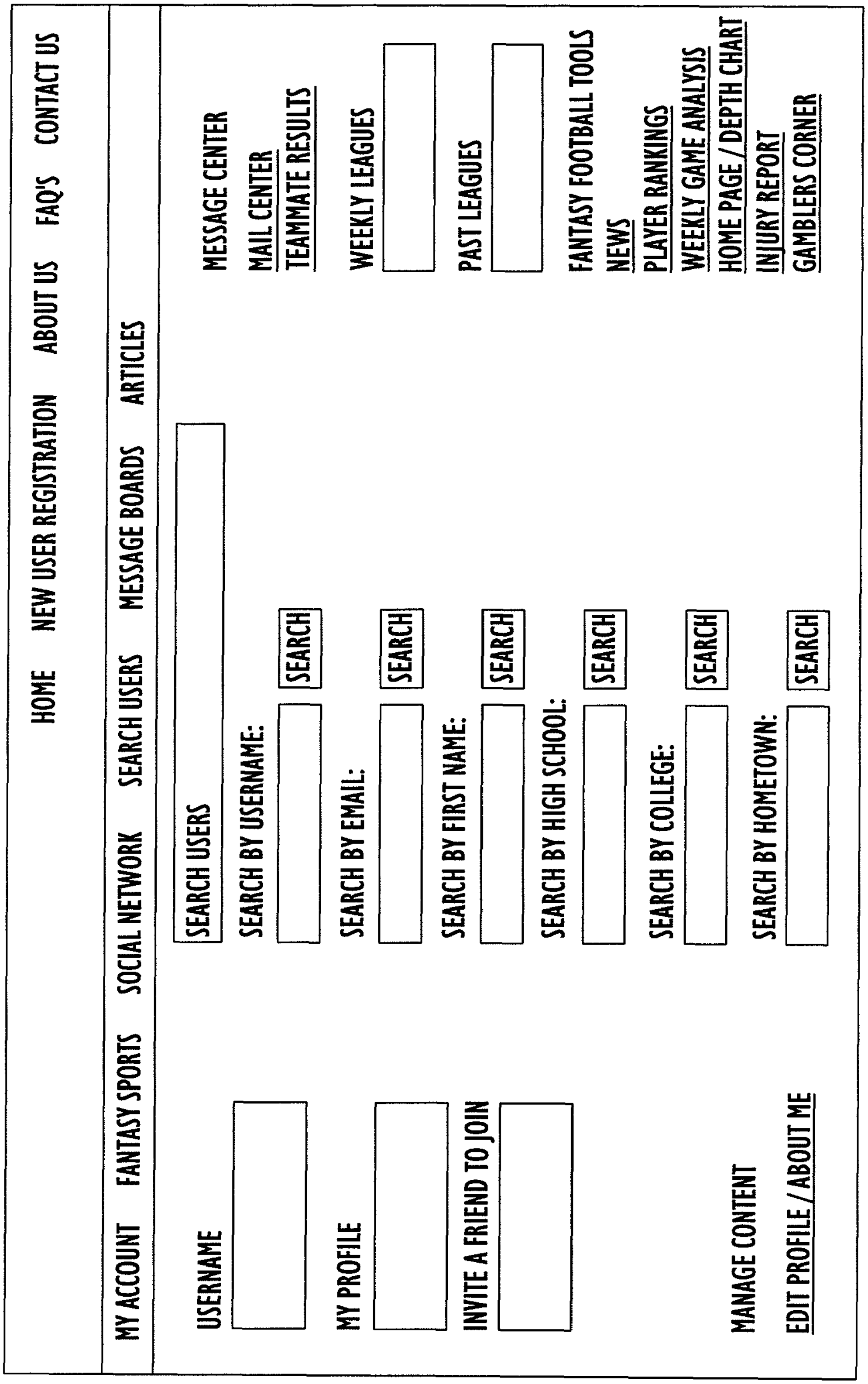
FIG. 18 is a schematic illustration of an example graphical user interface for searching registered system users according to an embodiment of the present invention.

The manner in which other users are searched based on certain search criteria is illustrated in FIG. 4. In particular, a user accesses a search page (FIG. 18) (e.g., a "Search Users" page) via a link, enters search criteria (e.g., username, e-mail address, first name, last name, age, hometown, occupation, schools attended, gender, favorite team, etc.) into an appropriate search field at step 10, and actuates a corresponding search button. The information is utilized to query database 102 (e.g., via PHP scripting) to retrieve users that match the entered criteria at step 11. The user may utilize one or more search criteria to conduct the search. The results are dynamically displayed (e.g. via PHP scripting) on a search results page as links to the corresponding user public view account pages at step 12. The user actuates one of the dynamic links to view a public view account page of a desired user at step 13. This desired user page further displays the network of teammates and other information posted by the desired user at step 14.

Figure 5:
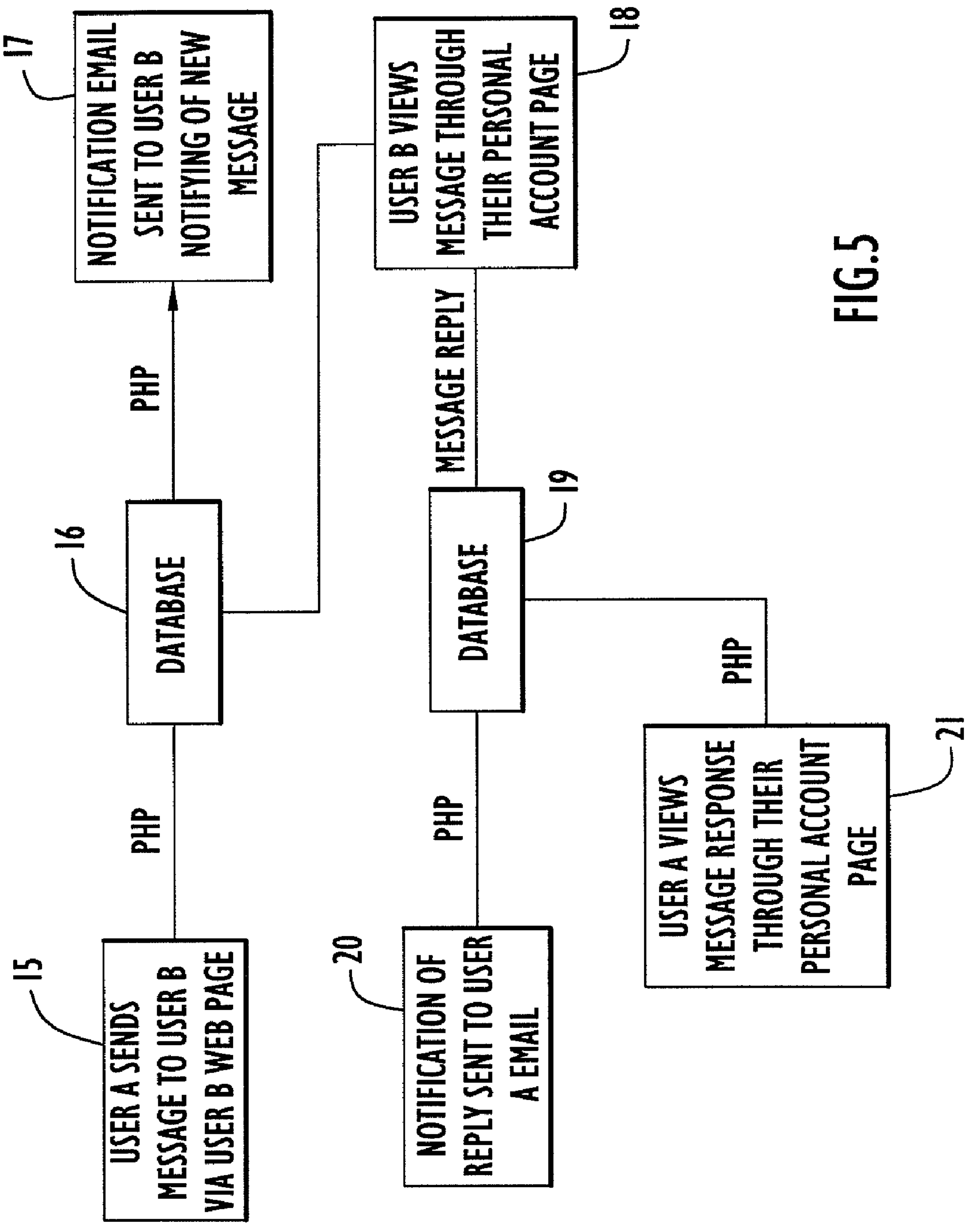
FIG. 5 is a flow diagram illustrating the manner in which messages are transferred among system users according to an embodiment of the present invention.
Figure 19:
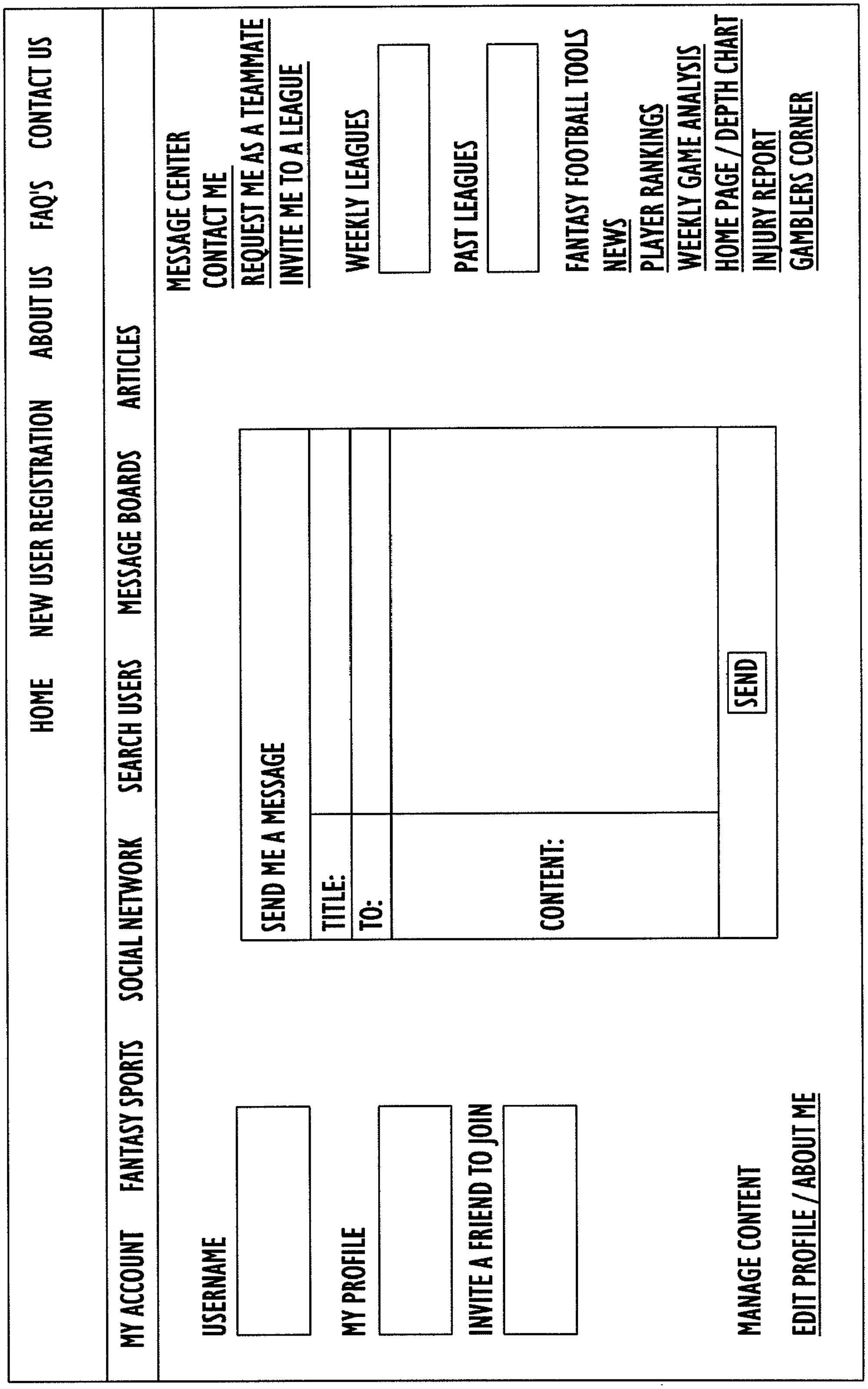
FIG. 19 is a schematic illustration of an example graphical user interface for sending messages between system users according to an embodiment of the present invention.
Figure 2C:
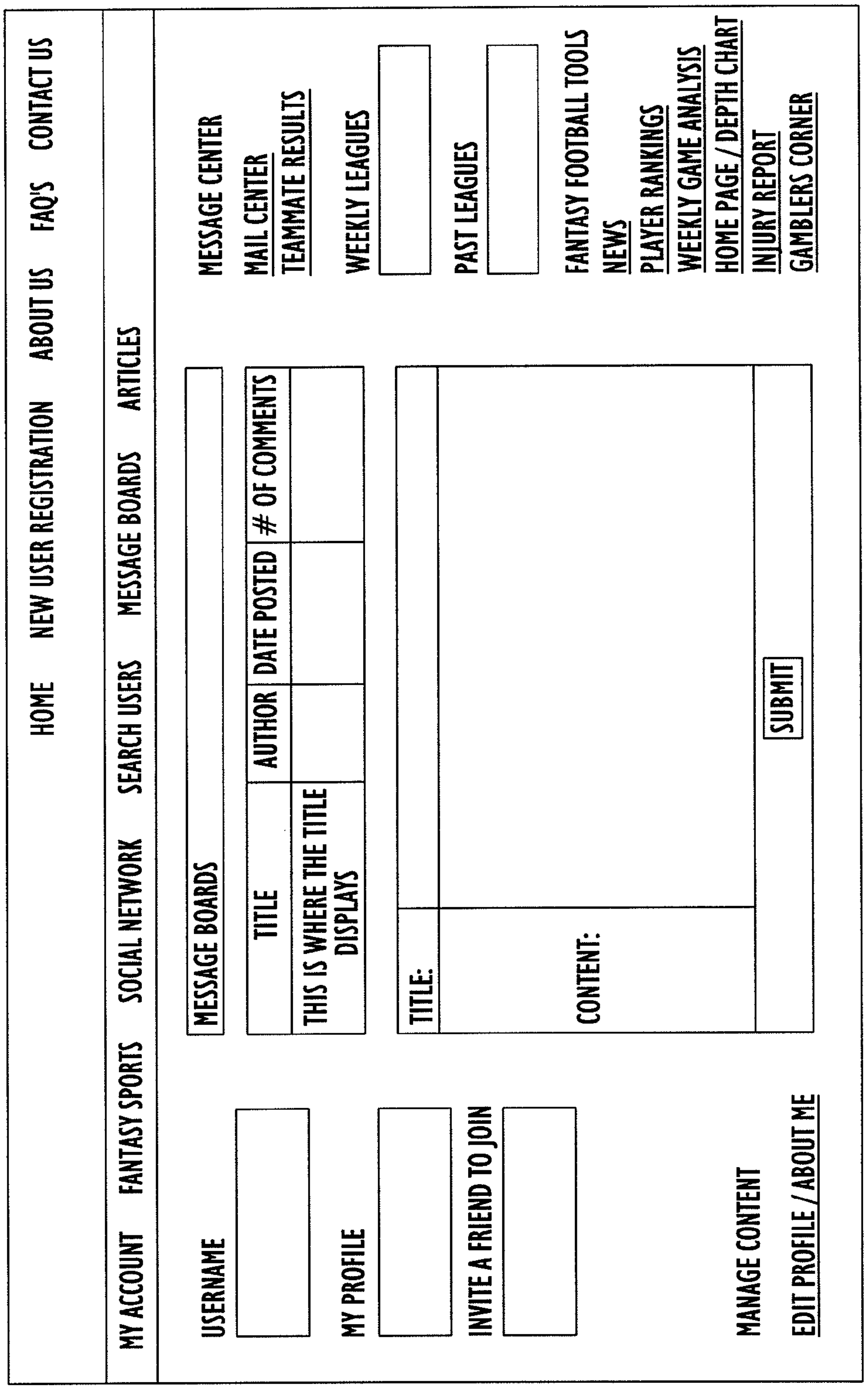

The fantasy sports system further enables users to send and receive messages. If a message is sent to a user, the user receiving the message may respond to or ignore (e.g., similar to an e-mail system) the received message. The manner in which the fantasy sports system transfers messages between users is illustrated in FIG. 5. By way of example, user A sends a message to user B, where user A is logged into the corresponding user account. User A navigates to the public view account page of user B and actuates a link (e.g., a "Contact Me" link) to send a message. User A is subsequently directed to a page (FIG. 19) to enter the title and content of the message to send to user B at step 15. The information is stored in database 102 (e.g., via PHP scripting) at step 16. A notification is sent (e.g., via PHP scripting) to user B via e-mail at step 17, and a dynamic link is placed on the personal account page of user B indicating the presence of a new message at step 18. User B navigates to the personal account page and actuates the link to view the new message. The content of the message is retrieved by querying database 102 (e.g., via PHP scripting) at step 18 and subsequently displayed. User B may respond to the message via a dynamic link on a message page. If user B decides to respond, the dynamic link to respond is actuated, where user B is directed to a page (e.g., similar to FIG. 19) where the content for the response may be entered. The response is stored in database 102 (e.g., via PHP scripting) at step 19.

User A receives notification of the response message via e-mail at step 20 and via a dynamic link on the personal account page. User A selects the link on the personal account page and is directed to a message page to view the content of the message at step 21. The message content is retrieved by querying database 102 (e.g., via PHP scripting) at step 21. The above process can be repeated to transfer messages between users (e.g., the process may start over for a new string of messages).

Figure 6:
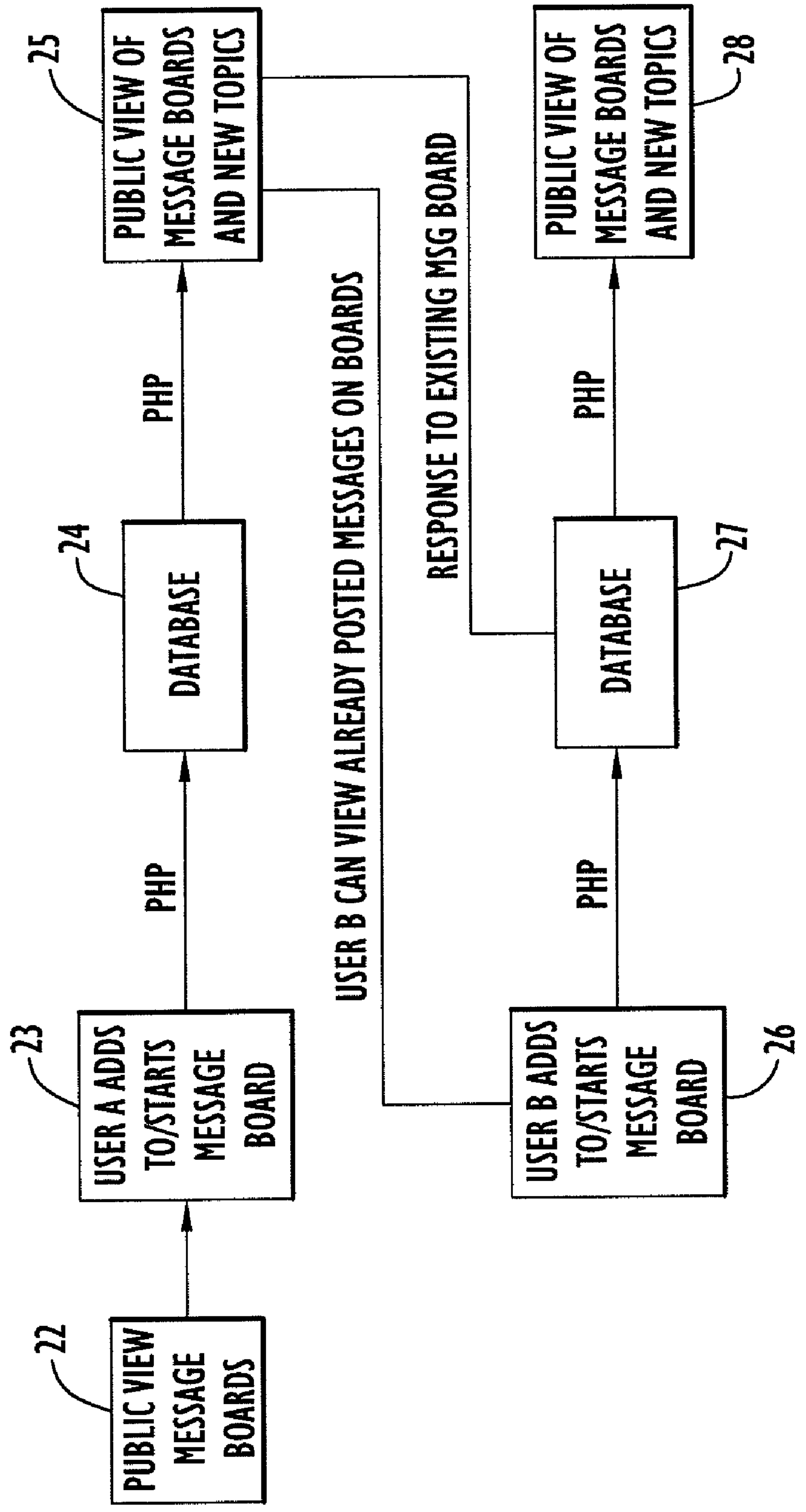
FIG. 6 is a flow diagram illustrating the manner in which message boards (or forums) may be created or updated according to an embodiment of the present invention.

The fantasy sports system further provides a message board to enable users to create a forum and discuss topics. The users enter the message board/forum and provide comments relating to the current discussion to add their thoughts to any desired topics. The manner in which message boards (or forums) are created by the fantasy sports system and receive information is illustrated in FIG. 6. By way of example, user A can create a corresponding message board subject and content, or search through existing message boards to identify a desired message board in order to add content. User A selects a link (e.g., a "Message Boards" link) to the message boards from the user personal account page and is directed to a message board string page dynamically displaying different message board strings at step 22. A message board string is composed of the original message and the corresponding responses or comments. In order to add content to an existing message board, user A selects a link to the desired message board, provides their content in the appropriate field of a message board content page (e.g., similar to FIG. 20) and actuates a link on that page (e.g., a "Submit" link) to submit the content at step 23.

When user A desires to create a new message board, the user actuates a start new message board link (e.g., a "Create New Topic" link) on the message board string page and provides a title and content in a field on a new message board page (FIG. 20). The new message board is submitted at step 23 via a link on the new message board page (e.g., a "Submit" link). The content is subsequently stored in database 102 (e.g., via PHP scripting) at step 24. The content is further posted to that particular message board and displayed by querying the database (e.g., via PHP scripting) at step 25. The message boards are displayed as dynamic links that provide the user with access to that particular message board. Other system users can view or add content to the created message boards. For example, user B may view or create message boards and add content on message boards at step 26, where content is displayed on the message board page at step 28 by querying (e.g., via PHP scripting) database 102 at step 27.

Figure 7:
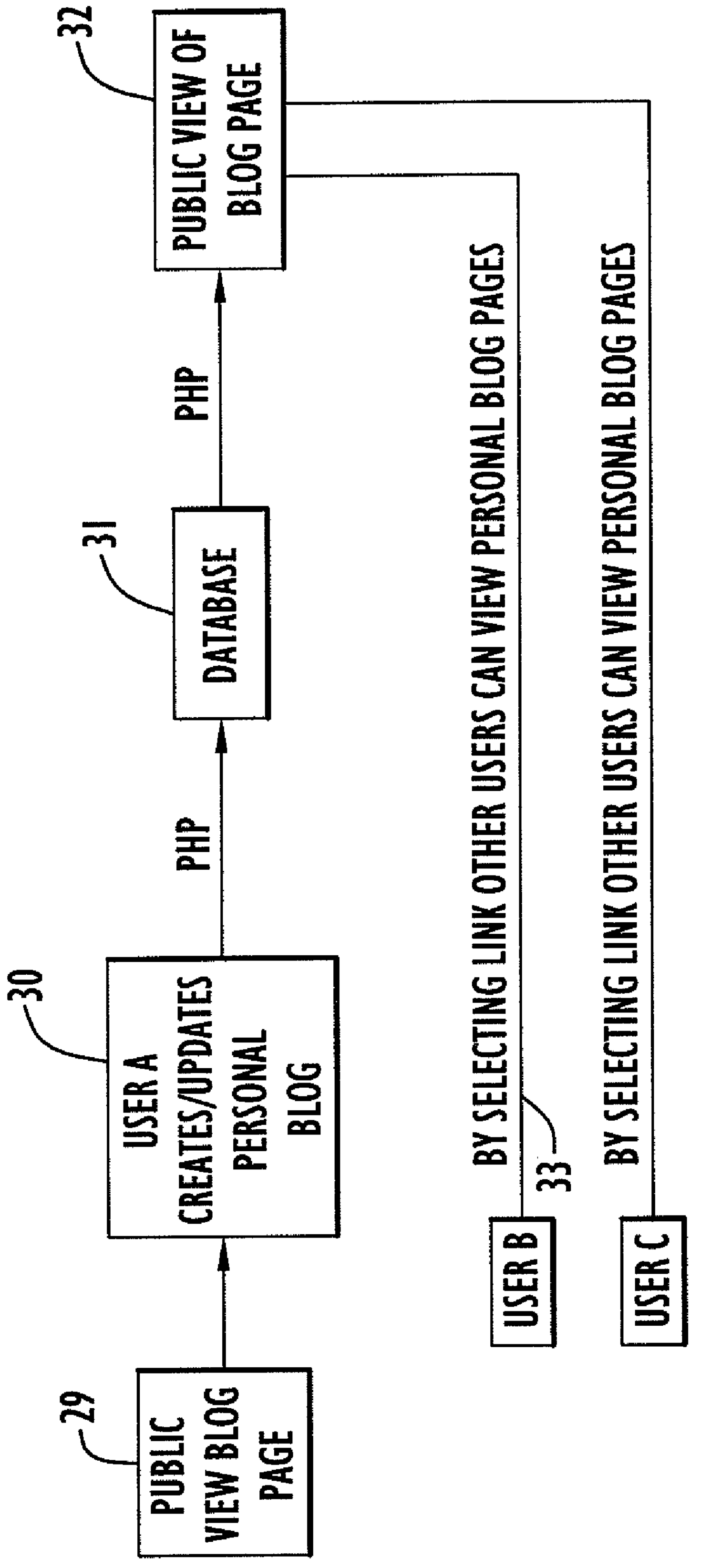
FIG. 7 is a flow diagram illustrating the manner in which blogs are created and edited according to an embodiment of the present invention.

The manner in which user blogs are created and edited is illustrated in FIG. 7. The networking component or module of the fantasy sports system enables users to post web logs (or blogs) on any topic. Articles or journal type entries may be provided and displayed, where users can supply titles for the entries and provide content for any desired topic. In particular, user A actuates a dynamic blog link (e.g., a "Manage Blog" link) on their personal account page at step 29. User A is subsequently directed to a blog page where the user can create or update a blog entry. User A enters a title and content of a blog into the field provided and submits the information at step 30. The information is sent to and stored in database 102 (e.g., via PHP scripting) at step 31. The title of the blog is displayed as a dynamic link on the public view account page of user A at step 32. This page is populated by querying database 102 (e.g., via PHP scripting) at step 31. Other registered system users (e.g., users B and C) can view the blog titles displayed on the public view account page of user A at step 33. In order to view the content of the blog, users B and C can actuate the link to the desired blog, where the link directs the user to a page that displays the content of the desired blog. The blog content is retrieved by querying database 102 (e.g., via PHP scripting) and displayed at step 33.

Operation of the networking component or module of the fantasy sports system is described. In particular, users initially register and enter information requested to create an account as described above. The users subsequently configure their profiles on corresponding user personal account pages (e.g., "My Account" pages) as described above, where the users enter personal information and upload profile pictures and music files (FIG. 2). The network of teammates is further established (FIG. 3) for users as described above. In order to establish the network of teammates, users can search for other users (FIG. 4) and request other users to become a teammate as described above. This request sends the requested teammate a message and an option to accept or decline the teammate request. If the requested teammate accepts, the accepting user is added to the requesting user page within a teammate section. The user can further link to other users within the network of teammates, and request teammates without using the search function.

The blog page (FIG. 7) may be accessed by actuating a blog link (e.g., a "Manage Blog" link) on a user personal account page. The user enters a title for the blog being created and the blog content, and submits the blog as described above. Users can view blogs from the personal account pages of other users. In order to create message boards or enter comments (FIG. 6), a user actuates a message board link (e.g., a "Message Board" link) on the user personal account page and either enters a particular message board, or initiates their own message board topic as described above. The user initiates a message board topic by actuating a topic link (e.g., a "Create New Topic" link), entering a title and content for the new message string, and submitting the message via actuation of a submission link. The message board topic and content become instantly viewable for other users to provide comments on the message board.

In order to send messages (FIG. 5), a user accesses the personal account page of a desired recipient and actuates a message link (e.g., a "Contact Me" link) as described above. The user enters a title and message content, and actuates a send link or button to send the message. This message is viewable by the recipient when checking the mailbox from the recipient personal account page. The recipient can respond to the received messages, or create new messages and send these messages to other users in the manner described above.

Users may view pages of other users from their personal account page in various manners. For example, a user may view the page of another user via a link within a teammate section of the user personal account page, via a link from a teammate section of another user personal account page, or a link to that other users page from search results (e.g., on the "Search Users" page).

The fantasy sports system may conduct fantasy sports competitions for weekly and playoff scenarios. These fantasy sports competitions include free (non-fee based) competitions and fee based competitions. In the free weekly competitions, users compete on a weekly basis for various prizes during the course of a fantasy sports season (e.g., weekly prizes, a prize shop and a grand prize). The fee based competitions require an entry fee for each user and enable the users to compete for various cash or other prizes (e.g., weekly cash or other prize awards and the prize shop). Each of the various types of competitions (e.g., free and fee based) include "open" and "private" (e.g., participation by invitation) competitions. Several competitions of the free and fee based types may be concurrently conducted during the course of a fantasy sports season, where these competitions typically include different groups of users.

The weekly "open" competition is designed preferably for users competing on a weekly basis. For example, users of this type of competition may compete for any desired weeks of a fantasy sports season (without an obligation to compete each week) and be eligible for the various prizes (e.g., weekly, grand prize, prize shop, etc.). Users draft an entirely new team each week that the user competes (e.g., a user is unable to maintain the same team or player for consecutive weeks). The open competition is preferably suited for users without sufficient other users to form a private competition described below.

A user navigates to an open competition page and may select a competition with a convenient draft date and time, or may create a new open competition. The fantasy sports system groups the user with other random system users to compose a competition for that particular week. The competition is identified by a unique code that links users with the competition. When the competition has an insufficient quantity of live users, the fantasy sports system can provide virtual users to complete the competition. Once the competition is formed, users log into their accounts prior to the draft time, and select their team during the draft (without trading of players) as described below. Users select players for their team based on predetermined team requirements (e.g., particular sports positions or roles). Users within the competition may communicate with each other via a competition page (e.g., a "My Game" page). Users compete against each of the other users in the competition for that week. With respect to the free competitions, users within these competitions further compete against each of the other system users with teams drafted in any of the public or private free competitions for the grand prize.

Users accumulate points throughout the fantasy sports season based on points earned during the weekly competitions. These points may be redeemed in the prize shop for any item with an appropriate point value. Users within the free competitions are eligible for a grand prize that is awarded based on the total points accumulated throughout the entire fantasy sports season. Points that are redeemed for prizes in the prize shop do not affect the cumulative points earned towards the grand prize. A user can switch between open and private competitions on a weekly basis without affecting the ability to accumulate points towards the grand prize (e.g., free competitions) or weekly prizes (e.g., awarded for the highest scores of the week in each created competition).

The post season or playoff competitions commence at the end of the regular fantasy sports season (e.g., the fantasy post season commencement is typically predetermined based on the corresponding professional sports season). The playoff competitions include free and fee based competitions each including open and private competitions (similar to the fantasy regular sports season). Once the professional sports teams qualifying for the post season are known, users may join an open or private playoff competition (similar to the open and private competitions described above). The users subsequently draft a team in accordance with predetermined team requirements (e.g., player positions or roles), where the teams remain fixed throughout the post season competition. As a professional sports team is eliminated from the post season, corresponding players of those teams are removed from the associated fantasy sports teams for the remainder of the post-season competition, thereby affecting users potential for accumulating points.

Users compete against each other user (e.g., on an aggregate basis) within their competition on a weekly basis. Therefore, player selections for a playoff fantasy team should be based on the player ability and the likelihood the player professional team remains in the post season. The fantasy team from each competition with the lowest points for the week is eliminated in order to provide a single winner for each competition at the end of the fantasy post season. The progress of each user may be viewed throughout the post-season competition on a corresponding user competition page (e.g., a "My Game" page), while users may further utilize these pages to communicate with each other. The free playoff competitions provide a grand prize awarded to the user with the most points from among the winners of the individual free playoff competitions.

A user initially registers with the fantasy sports system as a user for fee based and/or free competitions. If the user registers as a user for fee based competitions, the fantasy sports system requests the entry fee prior to enrolling the user in fee based competitions. However, the free and fee based competitions operate in substantially the same manner as described below with users of fee based competitions earning points to redeem in the prize shop, and to compete against other users in their fee based competition for predetermined weekly cash (and/or other prizes). The users of free competitions earn points to redeem in the prize shop, to compete against other users in their competition for weekly prizes, and to compete against other users in all the free competitions for the grand prize.

Figure 8:
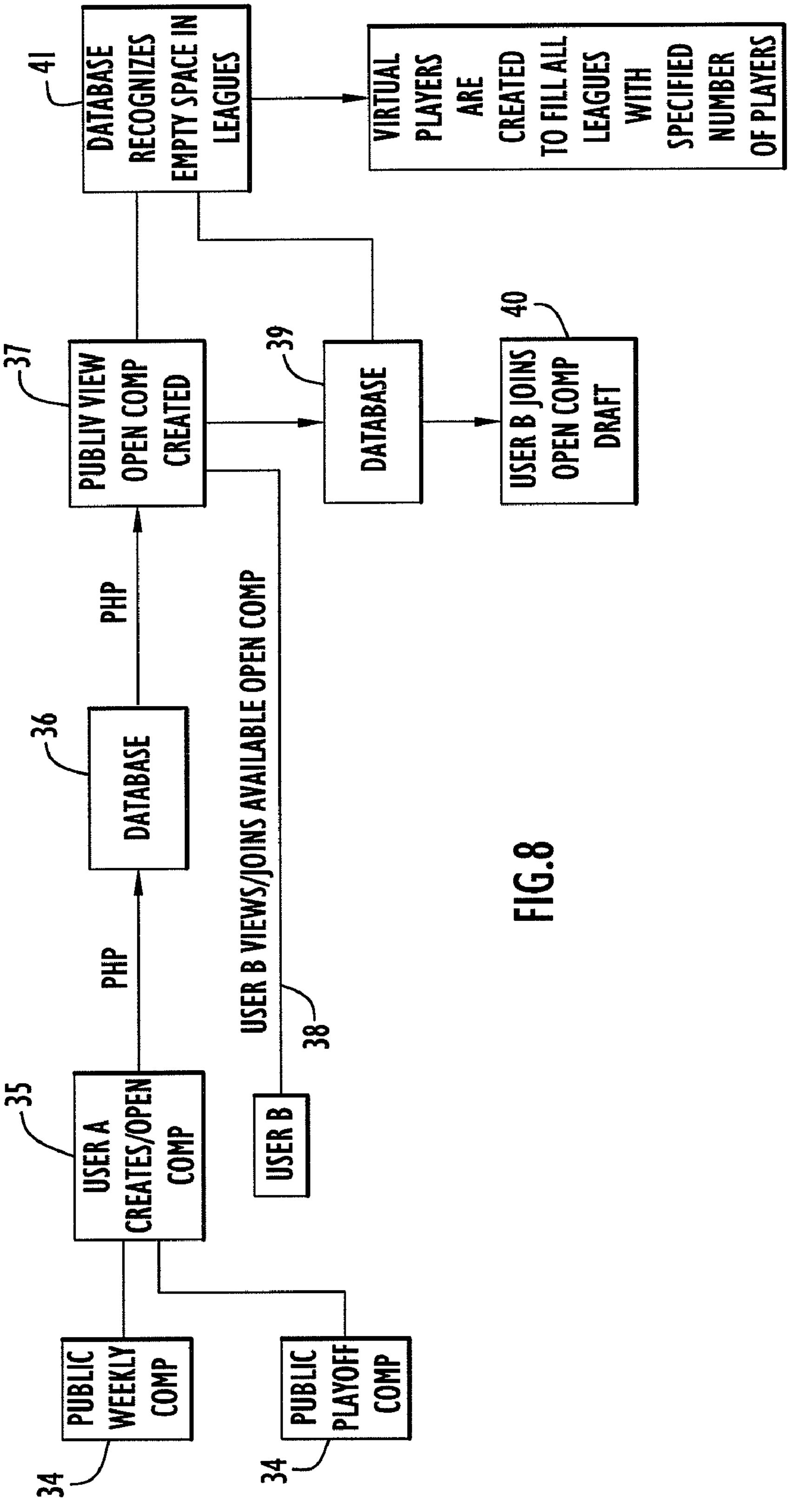
FIG. 8 is a flow diagram illustrating the manner in which open weekly and playoff type competitions are created and provided with users according to an embodiment of the present invention.
Figure 21:
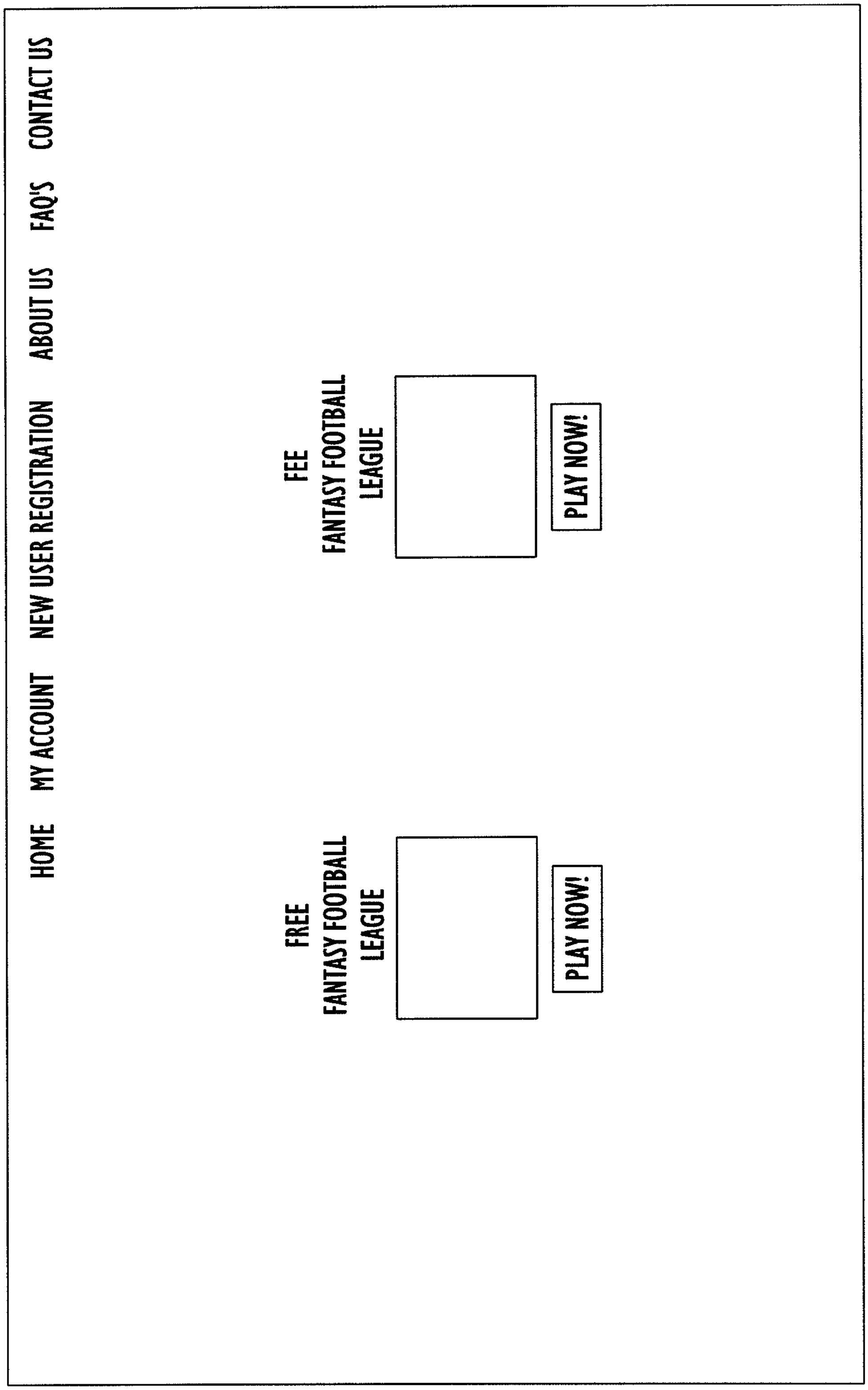
FIG. 21 is a schematic illustration of an example graphical user interface for accessing competitions according to an embodiment of the present invention.
Figure 22:
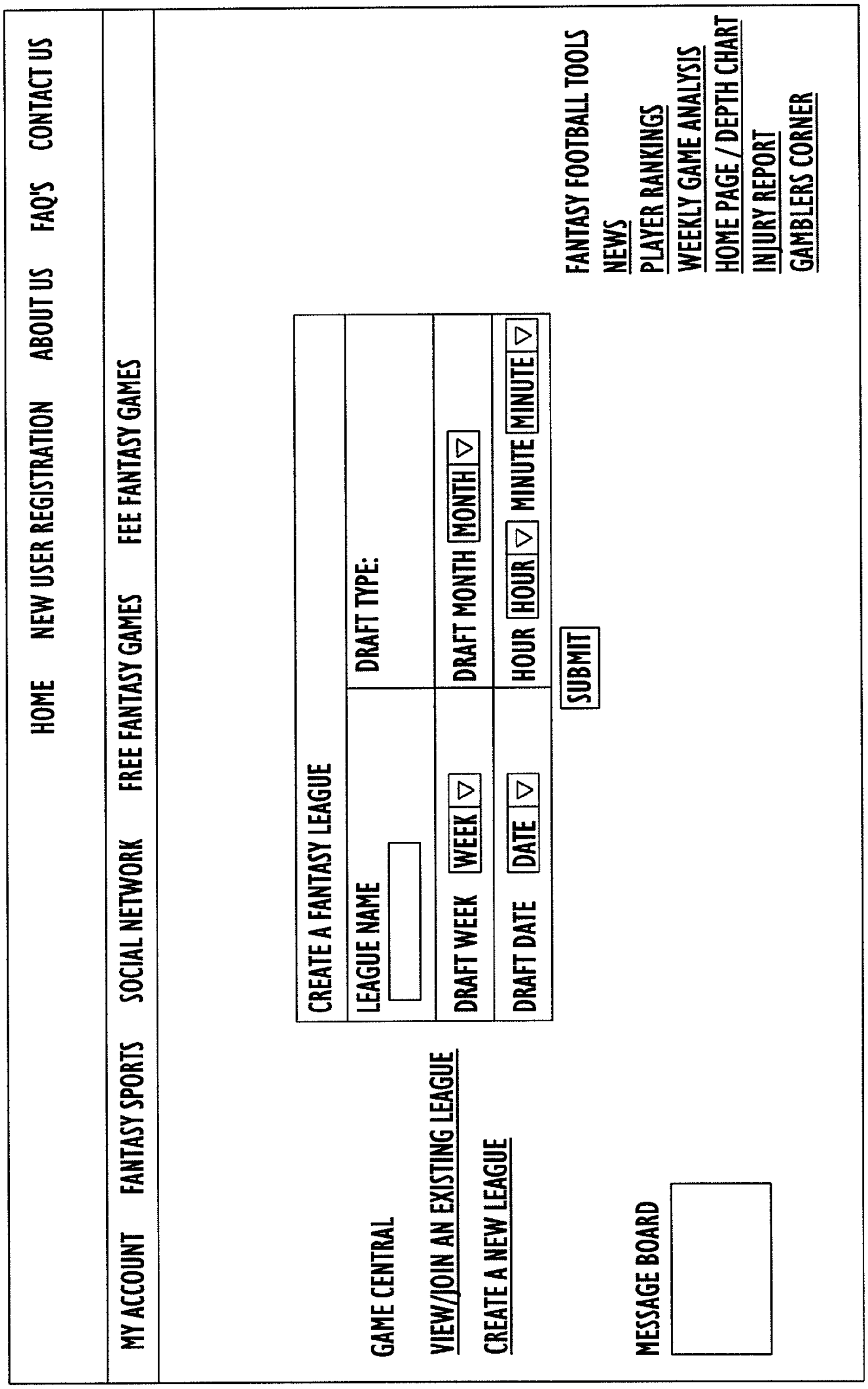
FIG. 22 is a schematic illustration of an example graphical user interface for creating a competition according to an embodiment of the present invention.
Figure 23:
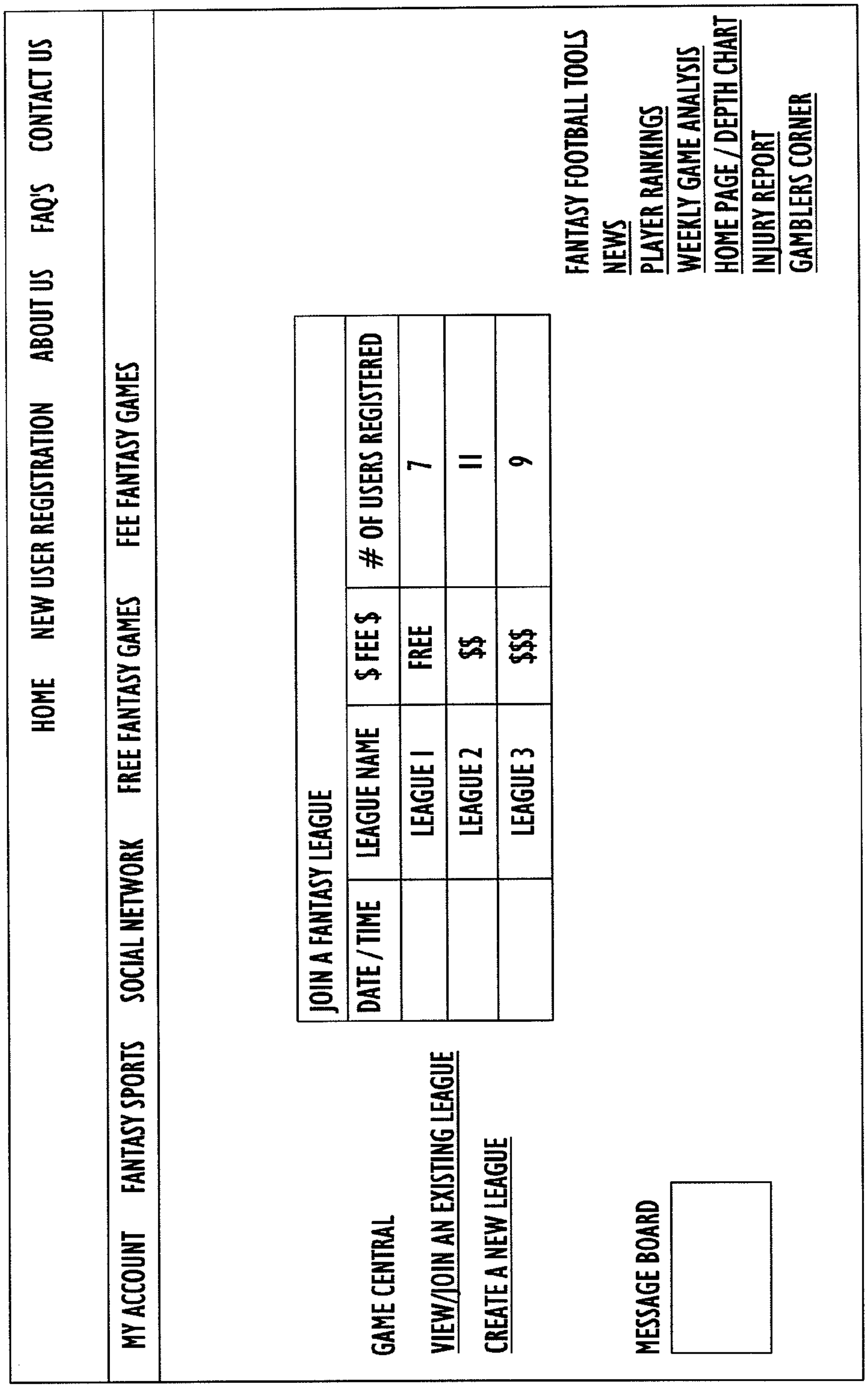
FIG. 23 is a schematic illustration of an example graphical user interface for joining a competition according to an embodiment of the present invention.

The manner in which the fantasy sports system enables users to create and join open competitions for the fantasy regular season and playoff competitions is illustrated in FIG. 8. In particular, user A selects either free or fee based competitions from a competition main page (FIG. 21) via a link (e.g., a "Play Now" link) for navigation to a competition selection page. The user subsequently selects an open regular season (e.g., weekly) or playoff competition (e.g., for free or fee based competitions) from this page (e.g., via actuation of a link) and is directed to the respective page for the selected competition at step 34. User A creates a new competition by actuating a dynamic link to create the new competition and is subsequently directed to a page (FIG. 22) to enter information required for creating the new competition at step 35. The new competition is created and stored in database 102 (e.g., via PHP scripting) at step 36. The database is queried to display all available competitions on an open competition page (e.g., via PHP scripting) at step 37. Once the competition is created, other users (e.g., user B) can either elect to join an existing competition (FIG. 23) or create a new competition (FIG. 22) at step 38.

In order to join a competition, user B actuates a dynamic link associated with the desired competition (FIG. 23) at step 39, where this user is added to the competition in database 102 (e.g., via PHP scripting) at step 40. This process continues until the competition fulfills the competition capacity with a predetermined number of users. In the event a competition includes an insufficient quantity of users, the fantasy sports system can create virtual users to fill remaining openings in the competition (and provide each competition with a uniform quantity of users) at step 41. These virtual users are basically implemented by computer software bots or agents that draft a team by selecting the best available players at the required positions or roles. Preferably, each competition includes the same quantity of users in order to provide competitions under the same conditions. For example, users may have an advantage in terms of selecting better players for their teams in competitions with less members (since fewer users are participating in a draft).

Figure 10:
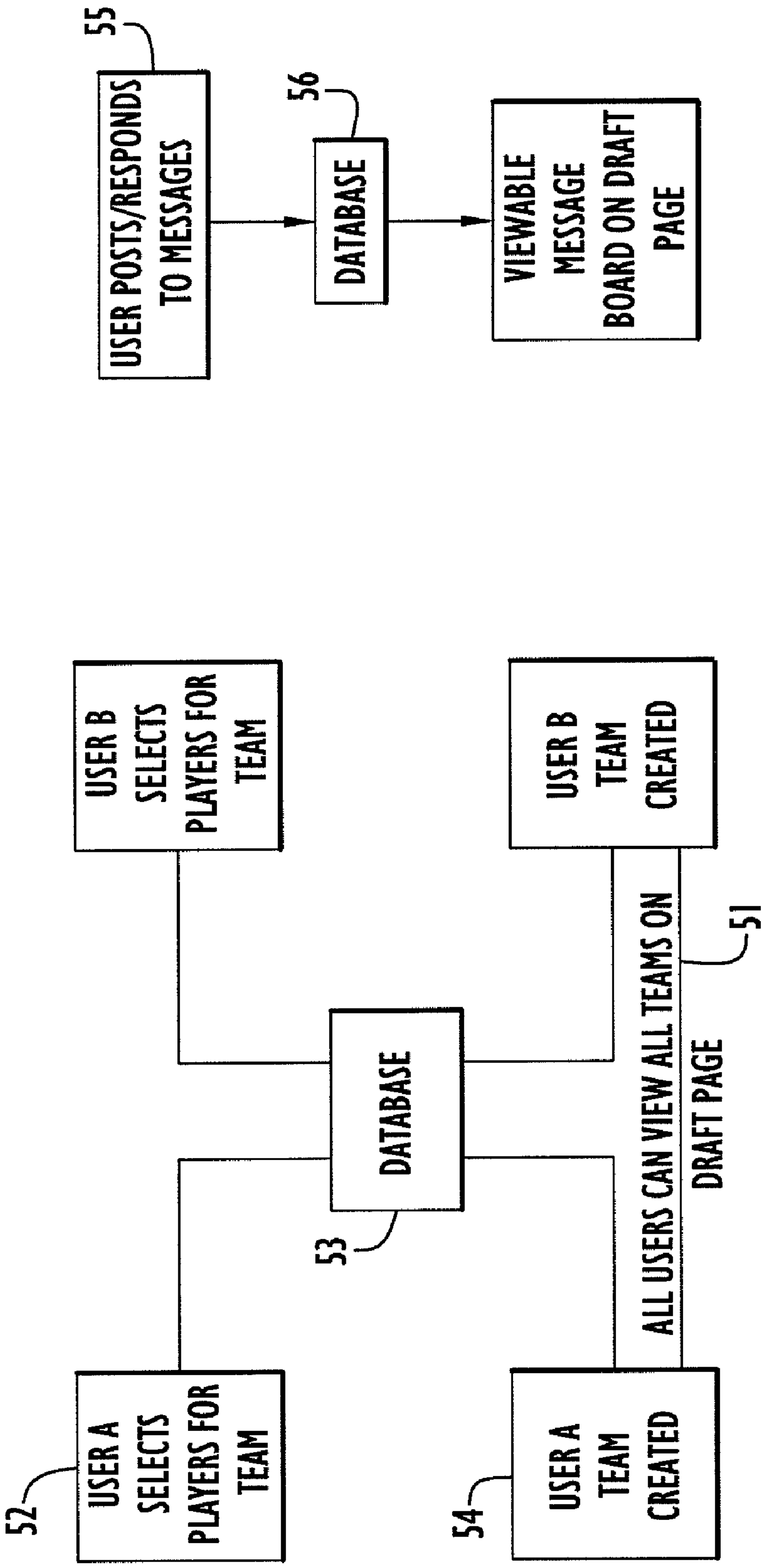
FIG. 10 is a flow diagram illustrating the manner in which players are selected for user teams for each of the various competitions (e.g., free, fee based, open, private, regular season and playoffs) according to an embodiment of the present invention.
Figure 11:
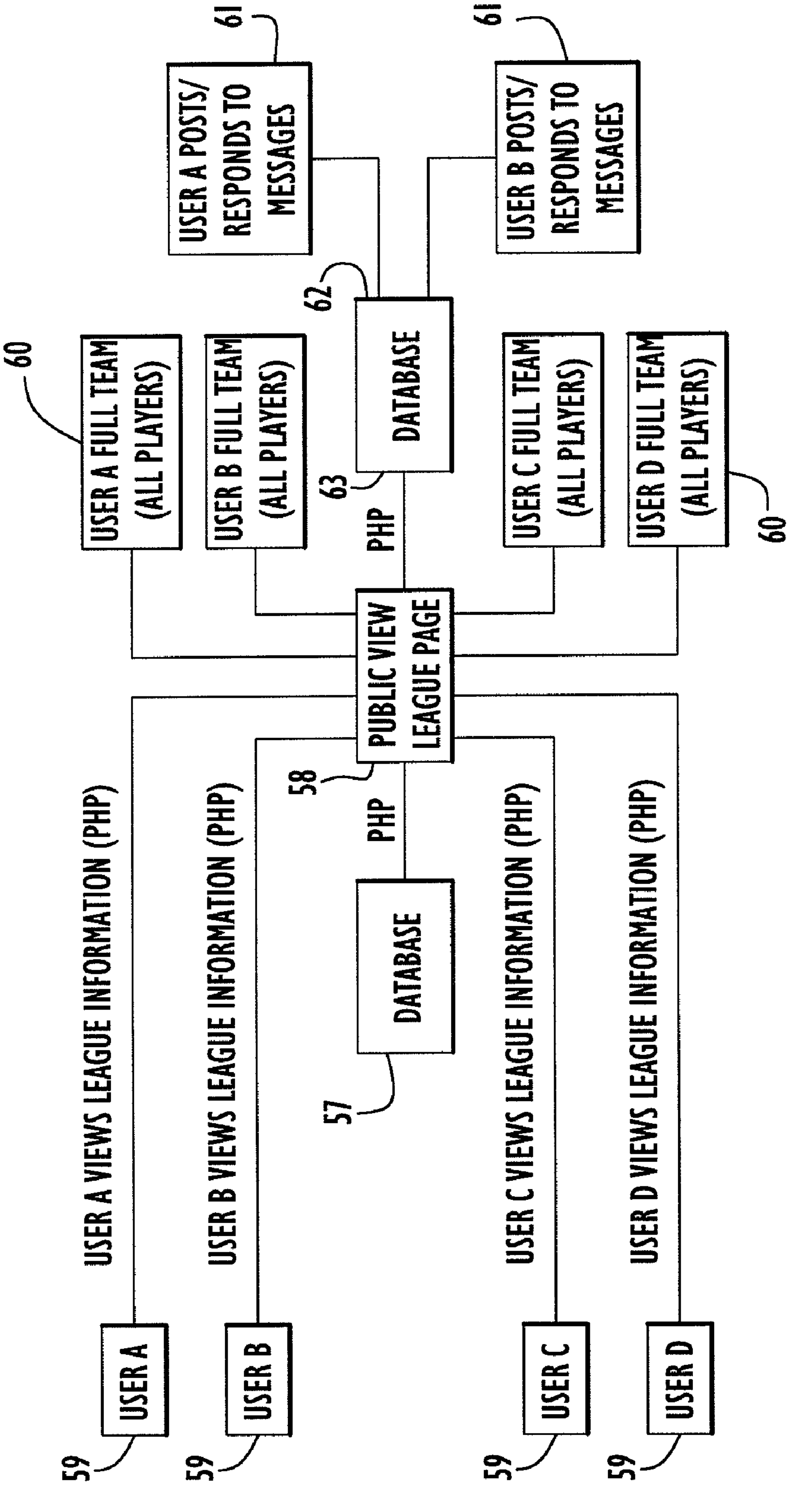
FIG. 11 is a flow diagram illustrating the manner in which competition information is stored and displayed and users communicate with each other during a competition according to an embodiment of the present invention.

Operation of a weekly (e.g., regular season) open competition is described. In particular, a user initially registers with the fantasy sports system (e.g., for fee based and/or free competitions) and creates a profile (FIG. 2) as described above. The user selects an open competition from a menu on any suitable page, and further selects a competition on an open competition page with a convenient date and time for the corresponding draft. If a convenient competition does not exist, the user can create a new open competition as described above. The user is grouped with other users that have selected the same draft date and time to fill the competition with users. The user is provided with a code unique to their competition that associates the user with that competition. Prior to the draft, users log into their accounts and navigate to a page that receives the code identifying the particular competition in order to access the draft. Users draft their teams for the particular week as described below (FIG. 10), where teams are fixed for the week (e.g., no trades are allowed and teams are disbanded after the week). Once the draft is complete, users access the competition via their competition page to view the results as described below (FIG. 11). Users may communicate with each other via the competition page or messages.

Figure 12:
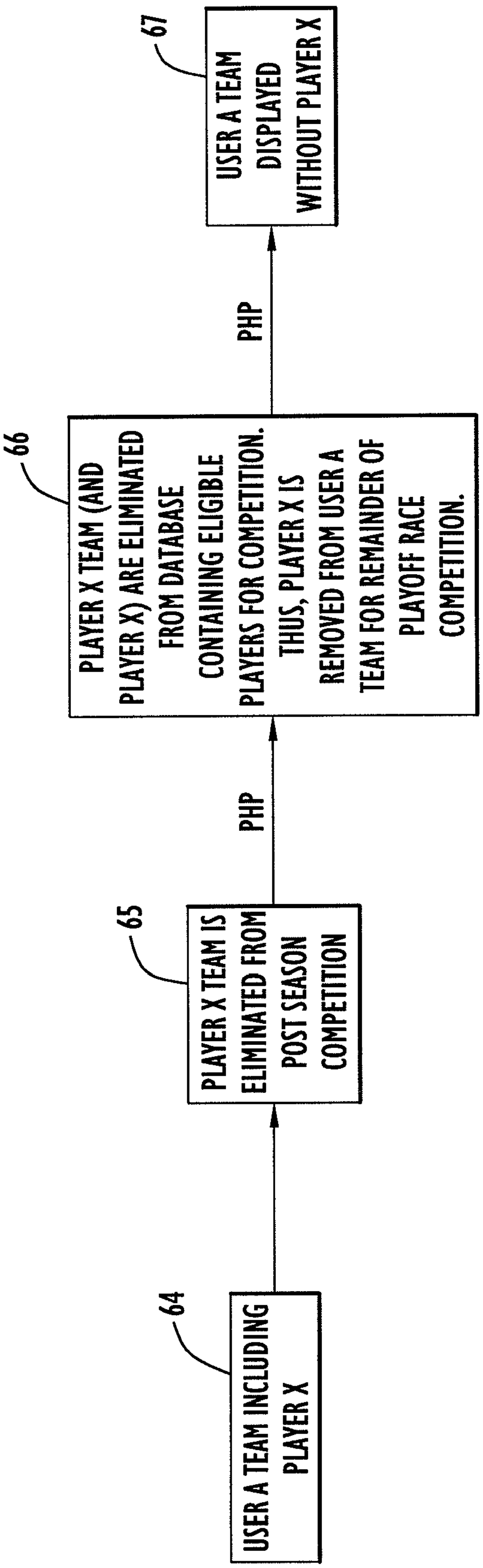
FIG. 12 is a flow diagram illustrating the manner in which open and private competitions are conducted for playoffs according to an embodiment of the present invention.

An open playoff competition is described. In particular, a user registers with the fantasy sports system (e.g., for free and/or based competitions) and creates their personal profile (FIG. 2) as described above. The user selects the playoff competition from a menu on any suitable page, and further actuates a link from a playoff competition main page to enroll in a playoff competition. The user selects a displayed competition with a convenient date and time for the draft, or may create a new playoff competition. The user is provided with a code unique to their playoff competition. Prior to the draft, users log into their accounts and locate the playoff competition via the code to commence the draft. Users select a team of players in accordance with predetermined requirements (e.g., player positions or roles) as described below (FIG. 10). Once the draft is completed, users view the progress of their team and communicate with other users in the competition via their competition page as described below (FIGS. 11-12).

The weekly private competition is designed preferably for users competing on a weekly basis. For example, users of this type of competition may compete for any desired weeks of a fantasy sports season (without an obligation to compete each week) and be eligible for the various prizes (e.g., weekly, grand prize, prize shop, etc.). Users draft an entirely new team each week that the user competes (e.g., a user is unable to maintain the same team or player for consecutive weeks). The weekly private competition enables users to invite specific individuals to enroll in the competition. A user in the role of a Commissioner or organizer accesses a private competition page, and establishes and organizes the competition. The organizer selects the competition name, date and time for a draft, and the users (e.g., including e-mail addresses or other contact information (e.g., telephone or fax numbers, etc.)) to invite into the competition for that particular week. Although only registered users can compete, the organizer can invite registered or unregistered users to join the competition. However, if a non-registered user accepts an offer to join the competition, registration with the fantasy sports system is required.

Once the organizer submits the information, an e-mail (e.g., or notifications by other manners, such as fax, telephone, etc.) is sent by the fantasy sports system to the designated individuals to invite those individuals to join the competition for that particular week. The designated individuals may accept or decline the invitation. When the competition has an insufficient quantity of live users, the fantasy sports system can provide virtual users to complete the competition. Once the competition is formed, users log into their accounts prior to the draft time, and select their team during the draft (without trading of players) as described below. Users select players for their team based on predetermined team requirements (e.g., particular sports positions or roles). Users within the competition may communicate with each other via a competition page (e.g., a "My Game" page). Users compete against each of the other users in the competition for that week. With respect to the free competitions, users further compete against each of the other system users with teams drafted in any of the public or private competitions for the grand prize.

Figure 13:
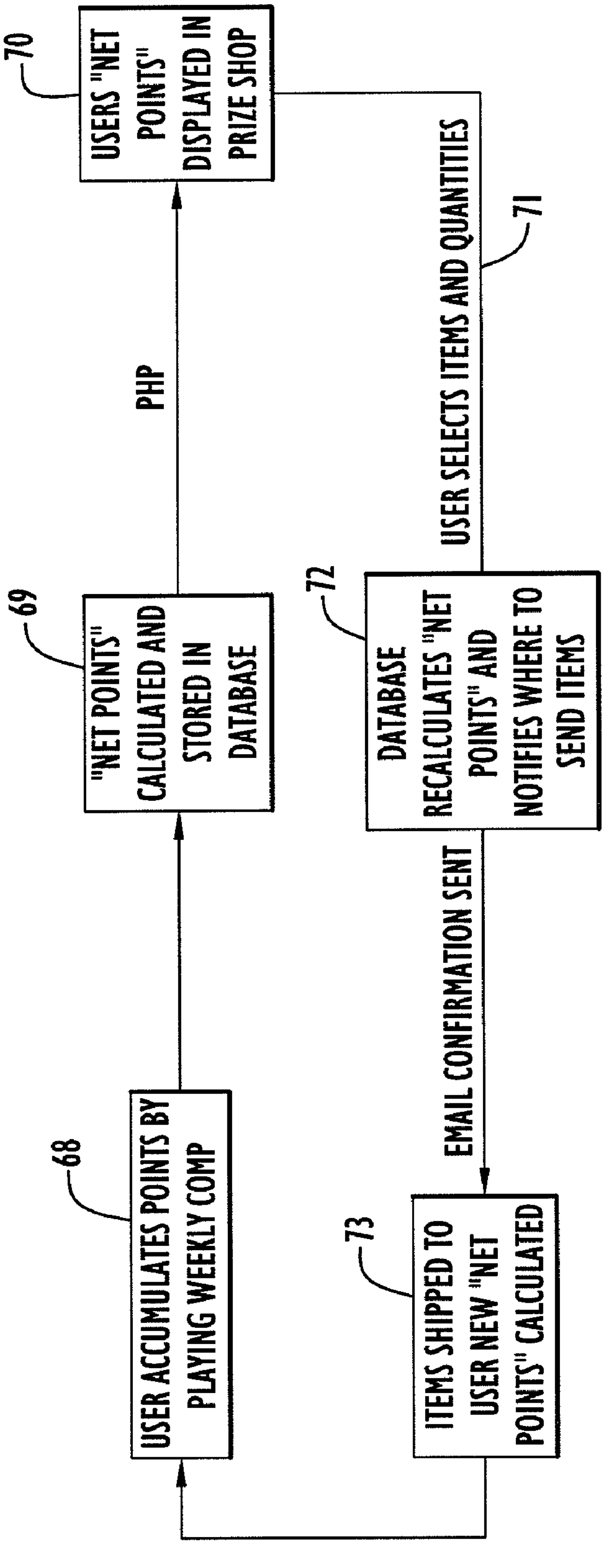
FIG. 13 is a flow diagram illustrating the manner in which points are accumulated and redeemed for prizes according to an embodiment of the present invention.
Figure 14:
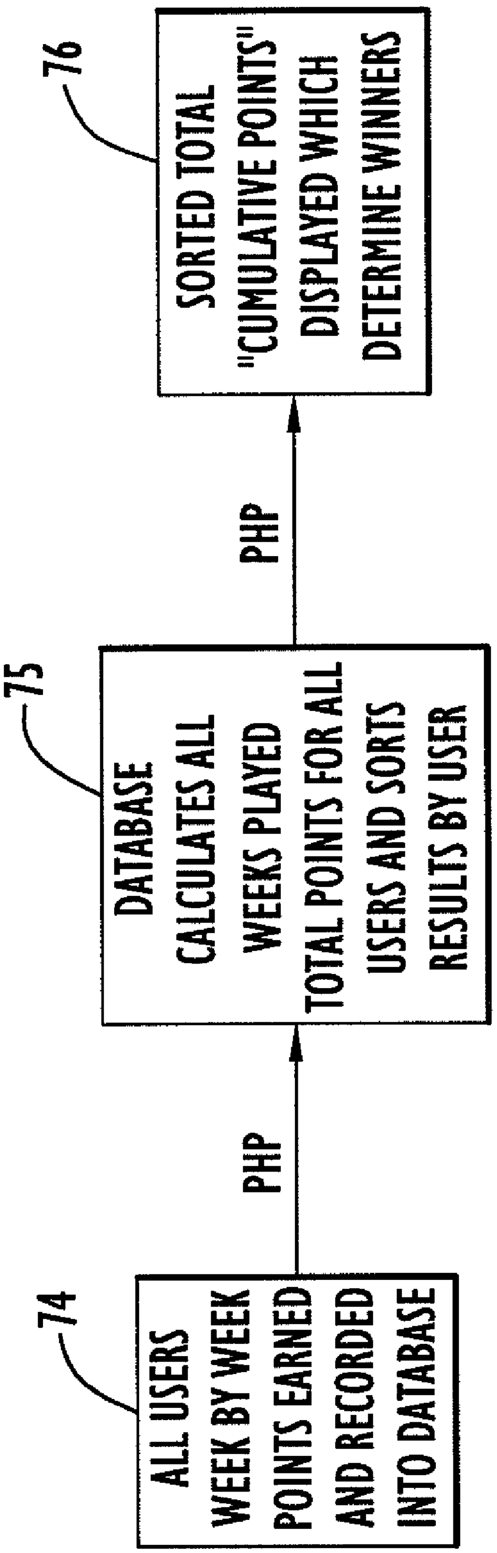
FIG. 14 is a flow diagram illustrating the manner in which participation and scoring is achieved for the grand prize within free competitions according to an embodiment of the present invention.

Users accumulate points throughout the fantasy sports season based on points earned during the weekly competitions as described below (FIG. 13). These points may be redeemed in the prize shop for any item with an appropriate point value. Users within the free competitions are eligible for a grand prize that is awarded based on the total points accumulated throughout the entire fantasy sports season as described below (FIG. 14). Points that are redeemed for prizes in the prize shop do not affect the cumulative points earned towards the grand prize. A user can switch between open and private competitions on a weekly basis without affecting the ability to accumulate points towards the grand prize (e.g., free competitions) or weekly prizes (e.g., awarded for the highest scores of the week in each created competition as described below (FIG. 15)).

Figure 9:
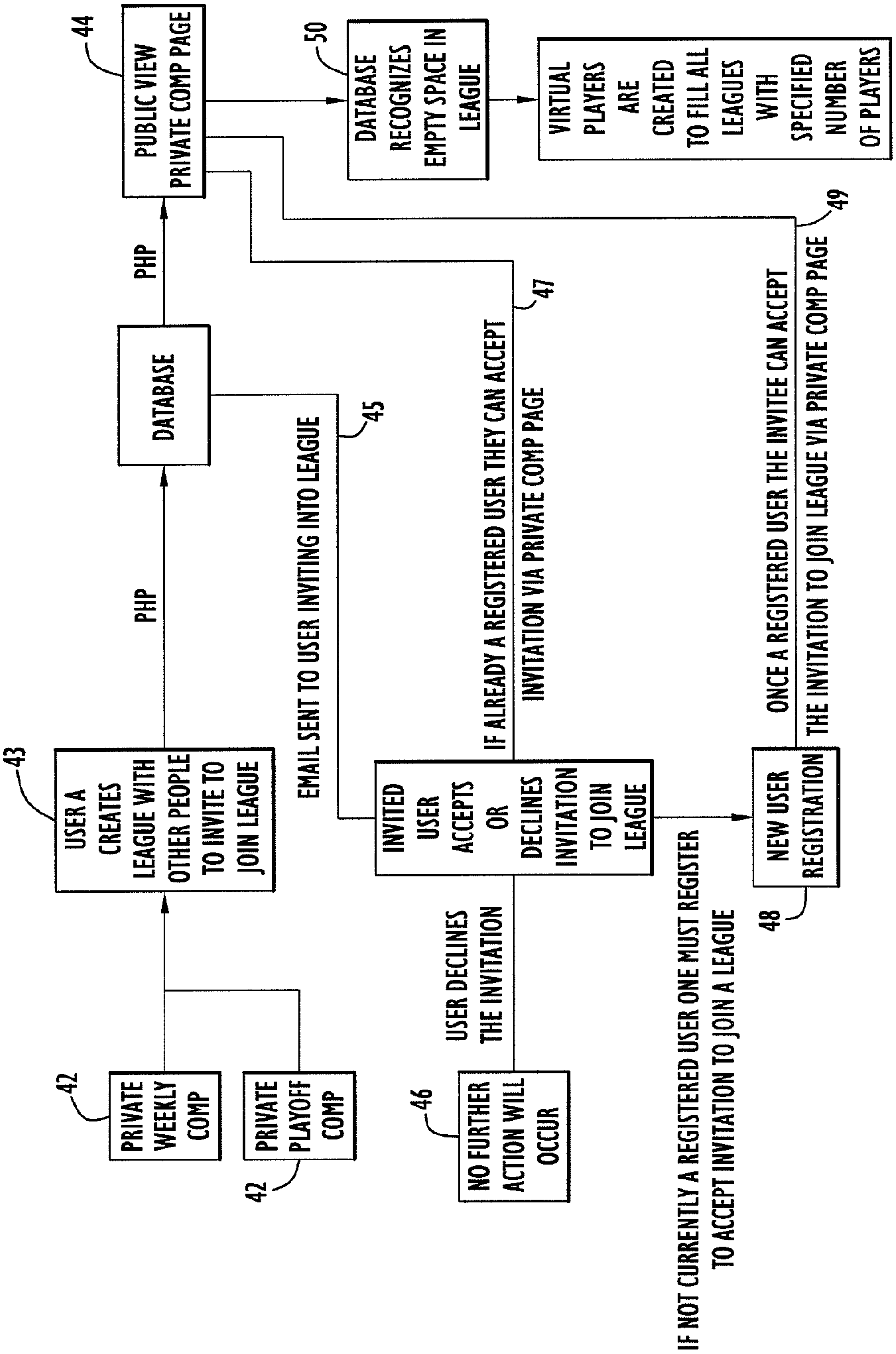
FIG. 9 is a flow diagram illustrating the manner in which private weekly and playoff type competitions are created and provided with users according to an embodiment of the present invention.

The manner in which the fantasy sports system enables users to create and join private regular season (e.g., weekly) and playoff competitions is illustrated in FIG. 9. In particular, user A selects either free or fee based competitions from a competition main page (FIG. 21) via a link (e.g., a "Play Now" link) for navigation to a competition selection page. The user subsequently selects a private regular season (e.g., weekly) or playoff competition (e.g., for free or fee based competitions) from this page (e.g., via actuation of a link). User A creates the private competition by navigating to a create private competition page (e.g., similar to FIG. 22) at step 42. User A enters requested information in fields of the private competition page to create the competition at step 43. This information is submitted to and stored in database 102 (e.g., via PHP scripting) at step 43. Once user A actuates a link to register the competition, the user is directed to a page to enter usernames, e-mail addresses or other contact information of individuals desired to be invited into the competition. The competition information is displayed on a public view join private competition page (e.g., similar to FIG. 23) by querying database 102 (e.g., via PHP scripting) at step 44. An e-mail (or other notification) is generated and sent to those individuals invited to join the competition for that week at step 45. The invited individuals may accept or decline the invitation. If the individual declines the invitation, no further action is pursued at step 46.

When the individual is a registered user and accepts the invitation to join the competition, the individual navigates to the public view join private competition page (e.g., similar to FIG. 23) for that particular competition in order to enroll. The individual is subsequently added to the competition in database 102 (e.g., via PHP scripting) at step 47. If the individual desires to accept the invitation and is not a registered user, the individual must navigate to new user registration at step 48 to create an account and establish a profile as described above (FIG. 2). Once the individual becomes a registered user, the individual can navigate to the public view join private competition page (e.g., similar to FIG. 23) to join the competition. The individual is added to the competition in database 102 (e.g., via PHP scripting) at step 49. In the event that a competition has an insufficient quantity of users, the fantasy sports system can create virtual users at step 50 to fill openings in the competition in substantially the same manner described above.

Operation of a weekly private (e.g., regular season) competition is described. Specifically, users register via new user registration as described above, log into their accounts and navigate to the private competition page via a menu on any suitable page. The competition organizer creates the private competition and selects the date and time for the draft on the private competition page (e.g., for free and/or fee based competitions). The organizer enters the e-mail addresses (or other contact information) of the individuals to be invited to enroll in the competition for that week. The organizer submits the information and is provided with a code identifying the competition. An e-mail (or other notification) is sent to the designated individuals inviting them to compete in the competition for that particular week and indicating the code identifying the competition. If an invited individual is unregistered, the individual must register with the fantasy sports system before participating in the competition.

Once registered, users log into their accounts prior to the draft and navigate to the competition (e.g., a "My game") page, where the code for the competition is entered in order to access the draft. Users draft a team according to predetermined requirements (e.g., player positions or roles) as described below (FIG. 10). Once the draft is completed, users may view their competition and results, post messages and link to other teams via their competition page (e.g., "My Game" page) as described below (FIG. 11).

The private playoff competition is described. In particular, a user registers with the fantasy sports system (e.g., for free and/or based competitions) and creates their personal profile (FIG. 2) as described above. The user selects the playoff competition from a menu on any suitable page, and further actuates a link from a playoff competition main page to enroll in a private playoff competition. The competition organizer creates the private playoff competition and selects the date and time for the draft on the private playoff competition page (e.g., similar to FIG. 22). The organizer enters the e-mail addresses (or other contact information) of the individuals to be invited to enroll in the competition for that week. The organizer submits the information and is provided with a code identifying the competition. An e-mail (or other notification) is sent to the designated individuals inviting them to compete in the competition and indicating the code (or other information) identifying the competition. If an invited individual is unregistered, the individual must register with the fantasy sports system before participating in the competition.

Once registered, users log into their accounts prior to the draft and navigate to the competition (e.g., a "My game") page, where the code for the competition is entered in order to access the draft. Users draft a team according to predetermined requirements (e.g., player positions or roles) as described below (FIG. 10). Once the draft is completed, users may view their competition and results, post messages and link to other teams via their competition page (e.g., "My Game" page) as described below (FIGS. 11-12).

Figure 24:
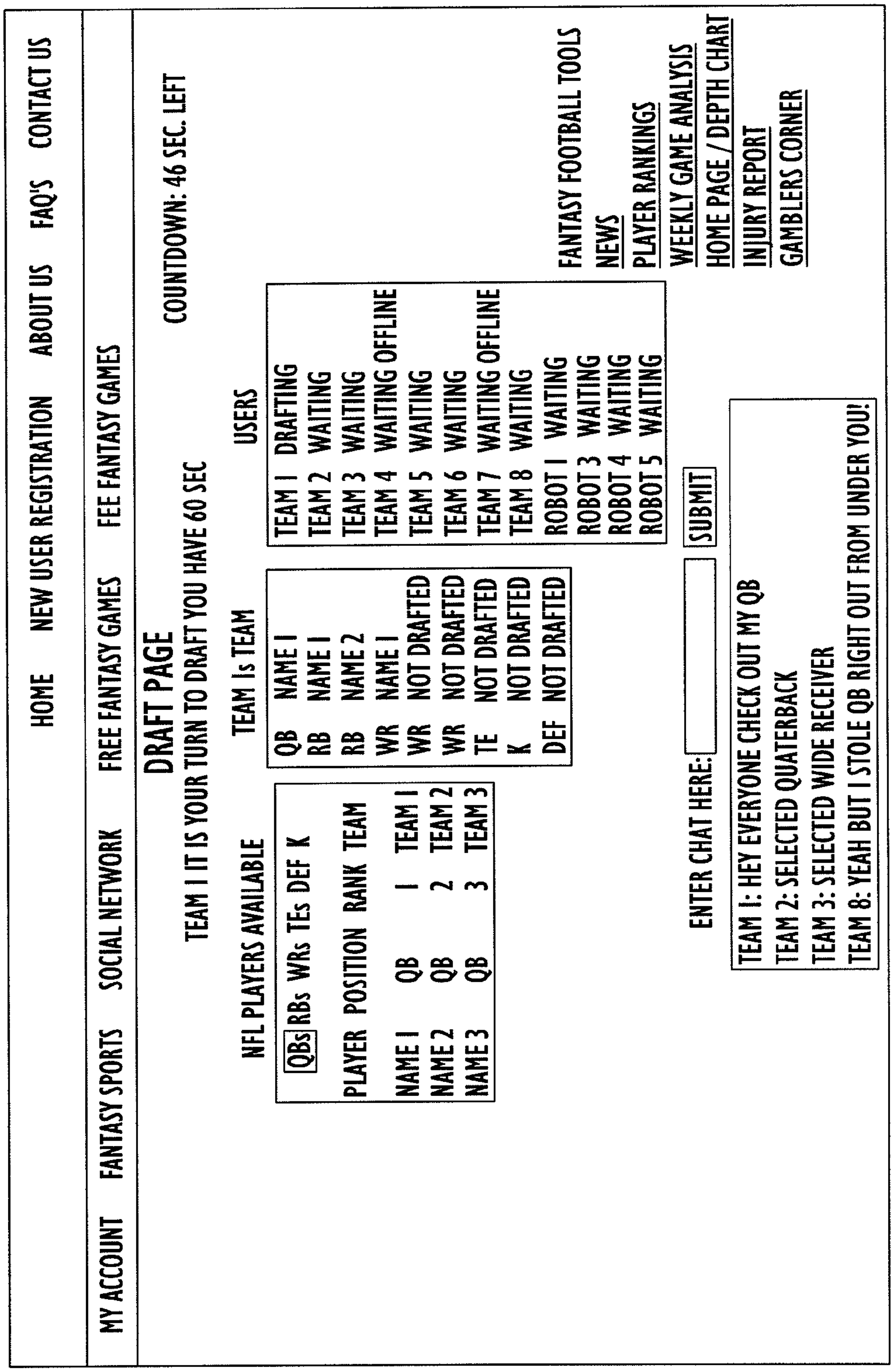
FIG. 24 is a schematic illustration of an example graphical user interface for drafting players according to an embodiment of the present invention.

The manner in which the fantasy sports system enables users to draft teams (e.g., for free, fee based, open, private and playoff competitions) is illustrated in FIG. 10. Specifically, users navigate to their corresponding competition draft via a dynamic link on a corresponding competition page. A draft page (FIG. 24) subsequently displays each user team name and a list field that is populated by selected players for that team at step 51. A list of available players is displayed from which each user selects desired players at step 52. The list is populated from database 102. The order in which users select players during the draft is determined based on random number generation.

Once a user has an opportunity to select a player, a clock or timer indicates the time interval for a user to select a player (e.g., the timer counts down a predetermined number of seconds in which the user must select a player). If the time interval expires before a selection is indicated, the highest ranked player for an unfilled sports position or role on the team is automatically selected. If a user fails to log into the draft prior to the start time, the entire team for that user is automatically drafted by selecting the highest ranked available player for unfilled sports positions or roles on the team. The draft picks (or selected players) are automatically updated in database 102 in real time at step 53, where selected players are eliminated from storage of the available players, and subsequently stored with the user team information at step 54. Users may view other teams in the competition on the draft page in real time as the teams are formed at step 51.

Users of a particular draft can post messages to communicate with the other users in their league on the draft page. The user enters the message content in a provided field and submits the information to post on the draft message board at step 55. The information is temporarily stored in database 102 and is displayed on the draft viewable message board at step 56.

Figure 25:
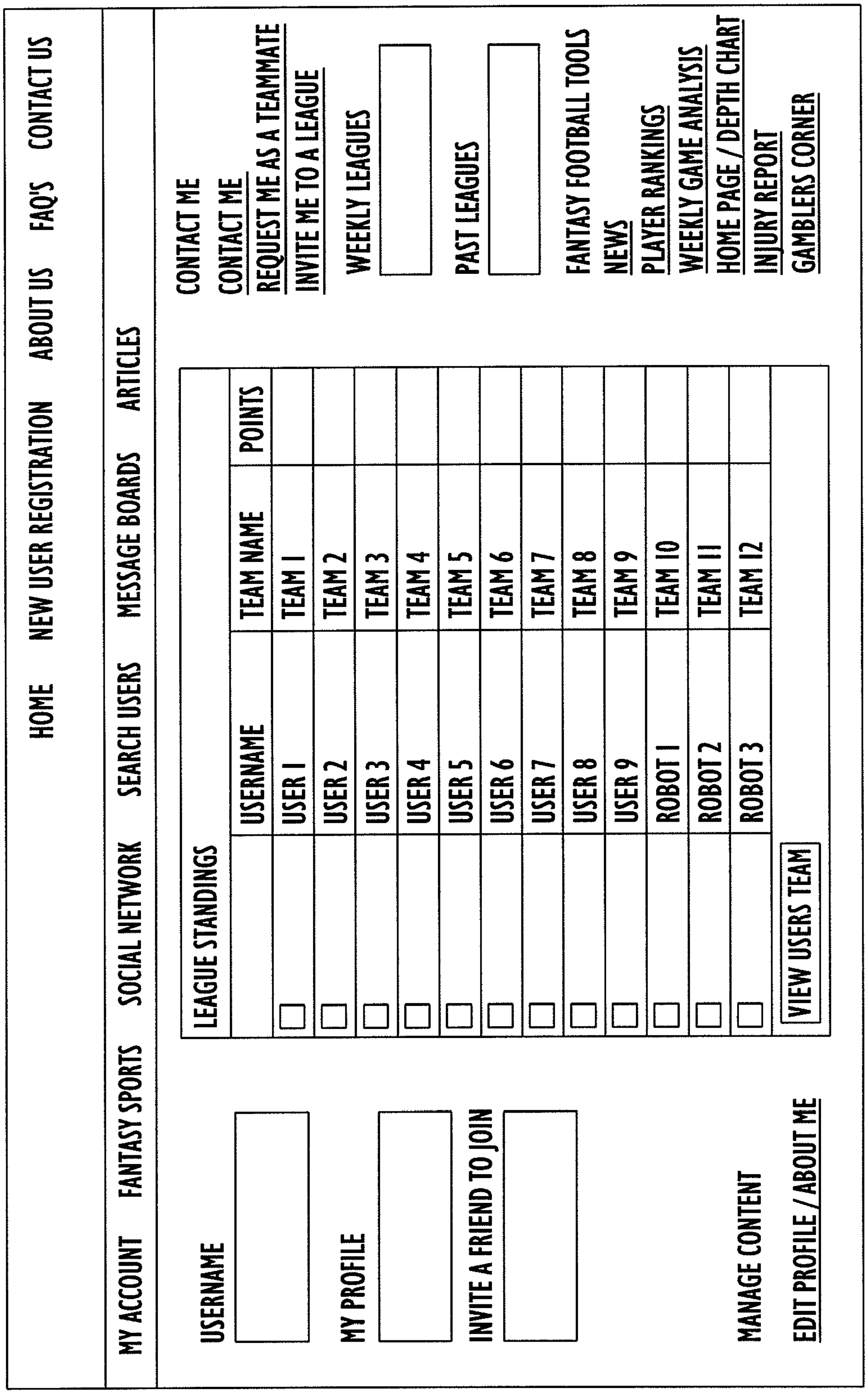
FIG. 25 is a schematic illustration of an example graphical user interface for display of standings according to an embodiment of the present invention.

The manner in which the fantasy sports system stores and displays competition information and enables users of a competition to communicate during the competition is illustrated in FIG. 11. Specifically, database 102 stores statistics (e.g., from a system administrator, information feeds, etc.) for each user team at step 57, where the fantasy sports system calculates the points earned for each user based on the performance of the selected players for the corresponding user team. The points and statistics are transferred from the database to the public view competition page (e.g., via PHP scripting) to determine standings at step 58. Each user (e.g., users A-D as viewed in FIG. 11) can view the standings on their public view page of their competition (FIG. 25) by navigating to that competition page at step 59. This page includes dynamic links to each user team page to enable users to view the performance of each player on that team at step 60. In order to post a message on a competition page, a user actuates a link to post the message, enters content in the fields provided on a message page and submits the information via submission link at step 61. The information is sent to database 102 (e.g., via PHP scripting) for storage at step 62. The database is queried to display the messages and responses on the public view competition page (e.g., via PHP scripting) at step 63.

The manner in which the fantasy sports system handles competition information for playoff competitions (e.g., free, fee based, open, private) is illustrated in FIG. 12. By way of example, the team associated with user A includes player X at step 64. Initially, the playoff competitions operate similar to the manner described above for the regular season, where information is handled in a manner similar to the manner described above for the regular season (FIG. 11). However, playoff users lose players from their fantasy team when the professional sports teams of those players become eliminated from the actual post-season. Accordingly, when the professional sports team of player X becomes eliminated from the actual post-season at step 65, player X is removed from the list of available players for the playoff competition and from the user A fantasy team each stored in database 102 at step 66. The user A team is subsequently displayed on the public view competition page (without player X) (e.g., via PHP scripting) at step 67. Users earn fantasy points for selected players whose professional teams remain in the actual professional sports playoffs.

The fantasy sports system awards a grand prize to users within the free weekly competitions. The grand prize is based on a competition among users in each of the free competitions, and is awarded to the one or more users accumulating the most fantasy points throughout the fantasy sports season. An example point structure for professional football game statistics is described below. A user may selectively participate in any desired weeks (e.g., does not necessarily need to participate each week) and be eligible for the grand prize. However, the more weeks a user participates in a competition (in an open or private competition), the greater the potential to accumulate fantasy points. A predetermined amount of users that have accumulated the most points earn prizes. The predetermined amount is based on the quantity of users in the weekly competitions (e.g., open or private competitions).

Points accumulated during the fantasy sports season are calculated on a cumulative and a net basis. The points are awarded based on performance of individual team players in their respective sports. The points may be assigned in any desired quantity or fashion to any occurrences or conditions in accordance with a particular sport or event (e.g., seven points are awarded to a user for each touchdown by their drafted players, ten points are awarded for each home run, etc.). Cumulative points are the amount of points a user accumulates during the course of the fantasy sports season. For example, a user may compete ten weeks during the fantasy sports season and earn the following points:

Week 1—100 points;
Week 2—95 points;
Week 3—110 points;
Week 4—115 points;
Week 5—125 points;
Week 6—100 points;
Week 7—105 points;
Week 8—90 points;
Week 9—100 points;
Week 10—105 points.

The user has a cumulative point total of 1045 points (100+95+110+115+125+100+105+90+100+105=1045).

These points are considered for awarding the grand prize, where users with the highest point totals at the end of the entire sports fantasy season are awarded prizes. In the event two or more users have equal point accumulations (e.g., ties), the prizes are awarded by the fantasy sports system based on various factors or contests. The accumulated points can be redeemed by the users in the prize shop throughout the fantasy sports season. If a user redeems points in the prize shop, these points do not affect the cumulative points considered for the grand prize.

The prize shop is similar to an arcade, where users can redeem points towards various merchandise as described below. Each user has a net points total that may be redeemed in the prize shop. Referring to the above example for cumulative points, when a user decides to redeem 450 points in the prize shop for an item, the net points after the redemption is 595 points (1045−450=595 points). Thus, the user has 595 net points to use towards future purchases in the prize shop. The user may compete for two more weeks and earn the following points:

Week 11—110 points;
Week 12—115 points.

In this case, the user cumulative points equal 1270 points (1045+110+115=1270 points), while the user net points equal 820 points (595+110+115=820 points). The user has 820 net points to redeem in the prize shop. The fantasy sports system maintains the point totals for each registered user. Users access the prize shop through a link on any suitable system page.

Figure 26:
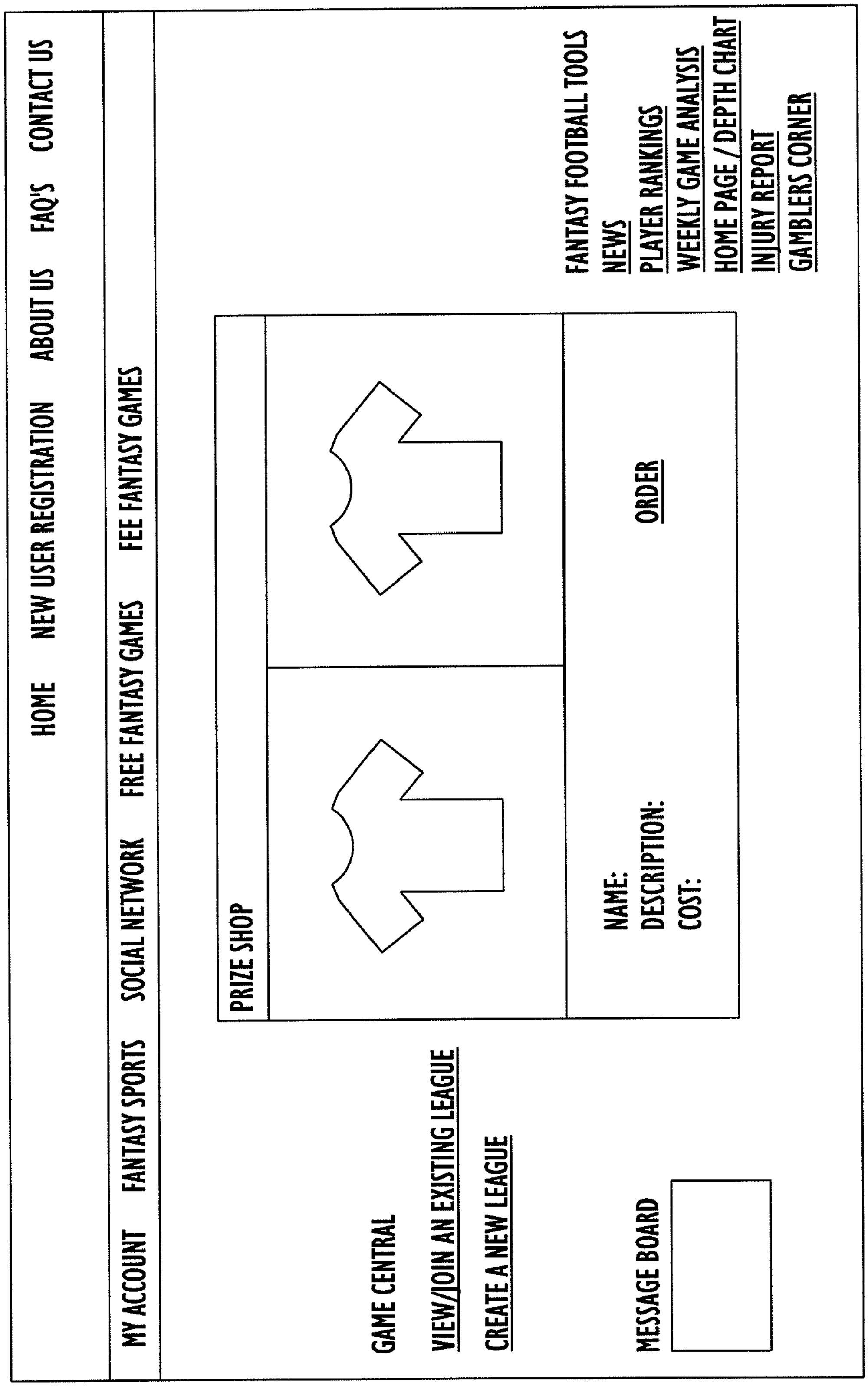
FIG. 26 is a schematic illustration of an example graphical user interface for redeeming points for prizes in the prize shop according to an embodiment of the present invention.

The manner in which the fantasy sports system enables users to accumulate points and redeem these points in the prize shop for merchandise is illustrated in FIG. 13. In particular, a user accumulates points by competing in weekly competitions (e.g., free, fee based, open, private, etc.) at step 68. Those points are stored in database 102 at step 69. Points that may be redeemed for merchandise are calculated as net points (e.g., the total amount of points a user has earned during competitions less the points redeemed in the prize shop). After a user is registered and accumulates sufficient points to redeem an item in the prize shop, the user navigates to a prize shop page (FIG. 26), where the user net points (these are the amount of points the user has available to redeem in the prize shop) and available merchandise are displayed at step 70. This is accomplished by querying database 102 (e.g., via PHP scripting) to retrieve the information for display. The user selects desired items and corresponding quantities of those item by entering this information in appropriate fields provided by an order page at step 71. The user submits the information at step 71 for storage in database 102 (e.g., via PHP scripting) at step 72. The fantasy sports system ensures that the user has sufficient points for the selected item. An e-mail confirmation is sent to the user, and the items are shipped at step 73. The net points total are updated based on the redemption for display when the user subsequently accesses the prize shop at step 73.

The manner in which the fantasy sports system determines the one or more users to receive a grand prize is illustrated in FIG. 14. Each system user participating within the free competitions (e.g., open or private) earns points from their participation during the fantasy sports season as described above. The points include cumulative points (e.g., cumulative points are the total number of points a user has accumulated over the course of the fantasy sports season) and are stored in database 102 at step 74. The points are further sorted by users at step 75. The standings for the users are calculated in real time and continually updated and displayed on corresponding standing pages (e.g., similar to FIG. 25 and via PHP scripting) at step 76. The one or more users earning the grand prize are determined by the calculated and sorted standings.

The users with the most points earned for each week are awarded prizes for that week. These weekly prizes are awarded for each week of the fantasy regular season. Users compete against other registered users within the same type of competition (free and fee based) for a particular week. For example, each user within the free competitions competes with the other users in the free open and free private competitions for a weekly prize, while each user within the fee based competitions competes with the other users in the fee based open and fee based private competitions for the weekly prize. A predetermined number of users are awarded a prize each week based on the total points accumulated for a particular week. In the event two or more users have equal point values for the particular week (e.g., ties), the prize is awarded by the fantasy sports system based on various factors or contests. The recipients for weekly prizes are determined each week, and each user participating in a competition is automatically entered for consideration of the weekly prize.

Figure 15:
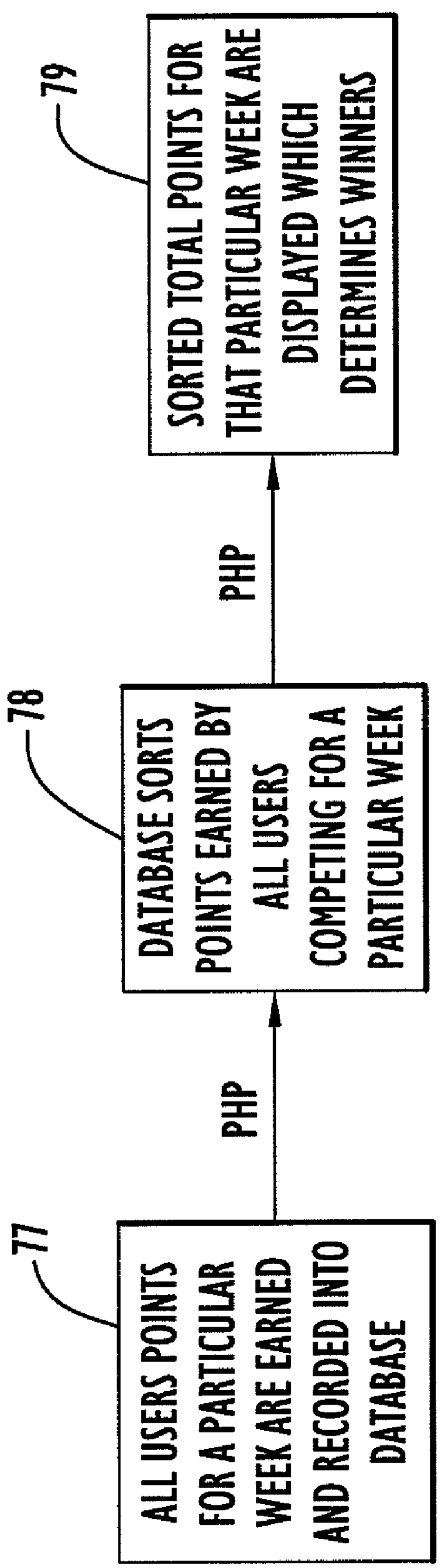
FIG. 15 is a flow diagram illustrating the manner in which participation and scoring is achieved for the weekly prize according to an embodiment of the present invention.

The manner in which the fantasy sports system determines the one or more users to receive a weekly prize is illustrated in FIG. 15. Each system user participating within the free and fee based competitions (e.g., open or private) earns points from their participation during the fantasy sports season as described above. At the conclusion of the professional sports events each week, points earned by users are stored in database 102 at step 77. The points are further sorted based on users at step 78. The standings for the users are calculated in real time and displayed on corresponding standing pages (e.g., similar to FIG. 25 and via PHP scripting) at step 79. The one or more users earning the weekly prizes are determined by the calculated and sorted standings.

It will be appreciated that the embodiments described above and illustrated in the drawings represent only a few of the many ways of implementing a system and method for conducting a fantasy sports competition.

The end-user and server systems employed by the present invention embodiments may be implemented by any quantity of any personal or other type of computer system (e.g., IBM-compatible, Apple, Macintosh, laptop, palm pilot, etc.), and may include any commercially available operating system (e.g., Windows, OS/2, Unix, Linux, etc.) and any commercially available or custom software (e.g., browser software, communications software, server software, fantasy sports competition system software of the present invention embodiments, etc.). These systems may include any types of monitors and input devices (e.g., keyboard, mouse, voice recognition, etc.) to enter and/or view information.

The communication network may be implemented by any quantity of any type of communications network (e.g., LAN, WAN, Internet, Intranet, VPN, etc.). The computer systems of the present invention embodiments (e.g., end-user systems, server systems, etc.) may include any conventional or other communications devices to communicate over the network via any conventional or other protocols. The computer systems (e.g., end-user system, server system, etc.) may utilize any type of connection (e.g., wired, wireless, etc.) for access to the network.

The database may be implemented by any quantity of conventional or other databases or storage structures (e.g., file, data structure, etc.), may be arranged in any fashion and may store any desired information relating to the user, system and/or competitions (e.g., user information (e.g., personal information, profile, net points, cumulative points, etc.), system information, standings, team information, draft information, etc.). The database may be local to or remote from the end-user and/or server computer systems.

The fantasy sports system may be utilized for any sports or other leagues, events or competitions, and may conduct team creations or drafts at any desired time intervals (e.g., one or more weeks, one or more days, one or more hours, per event, etc.). The fantasy sports system may provide any quantity or types of seasons (e.g., pre-season, regular season, post season, any quantity of seasons within an actual sports season, etc.). The fantasy sports system may be utilized with any type and/or level of sporting or other events (e.g., amateur, semi-professional, professional, high school, collegiate, pre-season, regular season, post season, baseball, basketball, football, hockey, golf, tennis, Olympics or Olympic events, lacrosse, spelling bees, chess tournaments, poker or similar tournaments, etc.). A fantasy sports season and post season may coincide in any manner with the corresponding actual sports season (e.g., a fantasy regular season may coincide with the any portions of an actual sport pre-season, regular season and/or post-season, the fantasy playoffs may coincide with any portions of the actual sports regular season and/or post season, etc.).

The display screens or pages may be of any quantity, may be arranged in any fashion and may contain any type of information. The web pages may be hosted by any quantity of any suitable server or other computer systems (e.g., service provider server system, third party server system, etc.). The pages may include any quantity of any types of input or navigation mechanisms (e.g., fields, radio or other buttons, icons, links, etc.) at any desired locations to receive information and/or initiate desired actions. The pages may be linked to each other and navigated in any desired fashion.

The fantasy sports system may provide any types of competitions with or without a fee. The fee based competitions may include any desired entry fee and provide any quantity of any types of prizes (e.g., cash, merchandise, gift cards, discounts, etc.). The entry fee may be requested in any fashion (e.g., web pages, e-mail, bill, etc.), and may be submitted via any suitable mechanisms (e.g., web pages, e-mail, credit card (on-line or manual submission), electronic funds transfer (on-line or manual submission), cash or instruments (e.g., check, etc.) (via ground mail or other manual delivery), etc.). The prizes may be offered at any desired time intervals (e.g., weekly, daily, per event, etc.). The free competitions may provide any quantity of any types of prizes (e.g., cash, merchandise, gift cards, discounts, etc.). The prizes may be offered at any desired time intervals (e.g., weekly, daily, per event, at the end of the fantasy sports season, etc.). The fee based and free competitions may further provide a grand prize.

The free and/or fee based competitions may include any quantities of any combinations of open and private competitions. The unique code for a competition may include any identifier uniquely identifying a particular competition. The code may include any quantity of any alphanumeric or other character or symbols. The open competitions may include any quantity of any users, where the users may enroll in any desired open competition (without an invitation) via any types of indications or actions (e.g., actuating a button or link on a page, contacting a system administrator, etc.). Any user may create an open competition and select any suitable time for a draft to initiate that competition. Users for the open competitions may be selected in any desired fashion (e.g., first to enroll, random selection, etc.).

The private competitions may include any quantity of any users. The organizer may be any user desiring to initiate a private competition, and may select any suitable time for a draft to initiate that competition. Invitations to join a private competition may be sent in any desired fashion (e.g., e-mail, fax, telephone, web page notification, etc.). The organizer or other users may enter any desired information to contact desired users for the competition (e.g., e-mail or other contact information, username, etc.). The invited users may accept or decline an invitation in any desired manner (e.g., e-mail, telephone, fax, web page, etc.). The invited users may accept within any desired time interval (e.g., hours, days, anytime prior to the competition draft, etc.) prior to having the invitation considered to be accepted or declined. Competitions may further be partially open (or private), where any desired quantity of openings may be assigned to selected users (e.g., by invitation) with remaining openings for any users.

The playoff competition may be free or fee based and open or private, and may be initiated by any user desiring to initiate a playoff competition. The playoff competition may coincide with any portion of the actual sports season (e.g., pre-season, regular season, post season, etc.). The playoff competition may be open to any desired users, or to selected users based on any desired criteria (e.g., top point earners during a fantasy regular season, etc.). The playoff competition may eliminate players or teams based on any desired criteria (e.g., corresponding sports team being eliminated, poor player or team performance, etc.). Alternatively, a user may be assessed a penalty (e.g., negative points, etc.) and be permitted to draft a replacement player for a removed player when the corresponding sports team of the removed player is eliminated from the post season to enable the user to continue to compete.

Any quantity of fantasy teams or drafted players may be eliminated in a playoff round based on any suitable criteria (e.g., predetermined number, actual outcomes in the sports post season, limit on teams or players to remove, etc.). The playoff competition may endure for any desired time interval in order to determine a winner. Alternatively, new drafts may be conducted for each week or other time interval of the playoffs to conduct competitions for that specific time interval. One or more winners of the playoff competition may be determined based on any suitable criteria (e.g., elimination, most points at the end of the playoffs, etc.). Prizes for the playoff competition may be awarded to one or more users at any desired time intervals (e.g., per event, at the end of the playoffs, etc.) and based on any suitable criteria (e.g., most points, individual player performance, etc.).

The competitions may have any desired predetermined quantity of openings. The fantasy sports system may provide any quantity of virtual players in order to fill openings of a competition. The virtual players may draft players in a draft based on any suitable criteria (e.g., randomly, best available player, need on filing positions, etc.). The competitions preferably include a uniform number of participants; however, each competition may alternatively include any desired quantity of participants.

Drafts may be conducted at any desired time intervals and any quantity of times during a fantasy sports season (e.g., weekly, daily, per event, etc.). Preferably, drafts are conducted at least two times during the fantasy sports regular season to provide users with different teams. The teams may draft any quantity of players for any suitable positions. The order for the draft may be determined in any suitable fashion (e.g., random order, user activity (e.g., guessing or other activity), predetermined, past performance in a competition, etc.). Each team may select a player within any desired time interval (e.g., minutes, seconds, etc.). The drafts may be conducted at any suitable day and time selected by the creator (or other users) of the particular competition. Users may interact in order to alter draft position (e.g., trading slots for players, trading points for draft positions, etc.). The draft page may include any desired mechanisms to post or receive messages (e.g., chat board, links, message type system, message board, etc.).

The fantasy sports system may determine points based on any desired schemes. Points may be accumulated by assigning any desired point values (e.g., whole numbers or fractions thereof, etc.) to any specific events in the actual competition (e.g., home run, touchdown, field goal, interceptions, strikeouts, points in a game, etc.). The point values assigned may be positive or negative (e.g., for adverse events caused by a drafted player, etc.). The points may be accumulated over any desired intervals or quantity of actual events to determine winners or users qualifying for prizes. The points may be redeemed for any suitable items in the prize shop. Points used in the prize shop may or may not affect the point total considered for the grand prize. The cumulative points may be determined over any desired time interval or quantity of events. The net points may be determined based on any desired criteria affecting the cumulative point total (e.g., points redeemed in the prize shop, points used for a trade of to alter a draft position, etc.).

Prizes may be awarded to any quantity of users based on any suitable criteria (e.g., highest accumulated points for a time interval, event, season, post season, individual drafted player performance; average points per event in a time interval; etc.) and at any desired time intervals (e.g., weekly, monthly, per event, pre-season, post season, etc.). Points for prizes may be accumulated during any of the fantasy sports seasons (e.g., regular season, post season) for any of the prizes (e.g., prize shop, weekly prize, grand prize, etc.). The prize shop, weekly (or other time interval) prizes and grand prizes may provide any desired prizes (e.g., cash, merchandise, gift card, services, etc.). The prizes in the prize shop may be assigned any suitable point values. Notification of prize awards may sent to users in any desired fashion (e.g., e-mail, ground mail, fax, telephone, etc.), where the prizes may be delivered in any suitable manner (e.g., electronically, manual delivery, etc.). Any users may compete against any other users for any prizes (e.g., users in any of the competition types may compete against any other users for weekly prizes, the grand prize, etc.). Ties for prizes may be decided in any desired fashion based on any criteria (e.g., randomly, point values for particular weeks or time intervals, average points, contest between users (e.g., trivia, guessing, etc.), quantity of times participated during the fantasy sports season, etc.).

The fantasy sports system may utilize any suitable interfaces (e.g., web pages, etc.) and may request any desired information (e.g., name, address, contact information, etc.) to register a user with the system. User accounts may be accessed via any suitable security scheme (e.g., user identification and password, etc.), where the user may interact with the system via any suitable interfaces (e.g., web pages, etc.).

The profile may be arranged in any fashion and include any desired information (e.g., name, address, contact information, likes, interests, etc.) about the user. The profile may further contain any information the user desires to share (e.g., uploaded music or other files, etc.). The user profile may be placed at any desired position on a page. User profiles may be accessed for editing or viewing via any suitable mechanisms (e.g., links from any suitable pages, etc.).

The users may be associated with or linked to any quantity of any desired other users. The teammate section of a page may be arranged in any fashion, and include any desired mechanism to link to other users (e.g., links, etc.), and may include any information about the other users (e.g., name, contact information, etc.). The mechanisms may link to any desired pages or information of the other users. The teammate section may be placed at any desired position on a page. The fantasy sports system may provide requests for linking to other users in any desired fashion (e.g., e-mail, web page links, etc.), where users may respond to requests in any manner (e.g., e-mal, web page links, etc.). A request may be automatically accepted or declined in the absence of a response within any desired time interval (e.g., day, week, etc.).

The search page may be arranged in any fashion, and include any desired mechanisms to search for other users (e.g., links, buttons, etc.). The search may be conducted based on any quantity of any suitable search criteria (e.g., name, username, competition, contact information, etc.). The search results may be displayed in any fashion or arrangement, and may link to any desired pages or information of the other users.

The users may send messages to any quantity of any desired other users. The messages may be to any quantity of other users (e.g., point to point, multicast or broadcast, etc.). The fantasy sports system may provide any desired mechanisms to send messages to other users (e.g., links, provide an address or username, etc.), where the messages may include any information. The fantasy sports system may provide notification of received messages to users in any desired fashion (e.g., e-mail, web page links, etc.), where users may view and/or reply to the messages in any manner (e.g., e-mail, web page links, etc.). The fantasy sports system may further provide mechanisms for managing messages (e.g., deleting, saving, etc.).

The blogs may be arranged in any fashion and include any desired information on any topic or subject (e.g., articles, commentary, etc.). The blog may further contain any information the user desires to share (e.g., uploaded music or other files, etc.). The blogs may be placed at any desired position on a page. The blogs may be accessed for editing or viewing via any suitable mechanisms (e.g., links from any suitable pages, etc.). Users may create any quantity of any types of blogs.

The message boards may be arranged in any fashion and include any desired information on any topic or subject. The message boards may be created or accessed for providing responses or viewing via any suitable mechanisms (e.g., links from any suitable pages, etc.). Users may create or add to any quantity of message boards.

The various users, time intervals and/or types of events illustrated in the drawings and mentioned herein are merely for description purposes and do not limit the present invention embodiments to any specific quantity of users, time intervals or types of events. The fantasy sports system may accommodate any quantity of users, any time intervals and any types of events to perform the actions described above. Users may selectively participate in any quantity of the fantasy competitions each time interval (e.g., week), and may provide any quantity of selected players on a roster, where the selected roster players are eligible to earn points for the users.

The fantasy sports system may alternatively retrieve for a user the code for a competition for which the user is enrolled and provide a link on any suitable page to the competition draft at any time (e.g., minutes, hours, days, etc.) prior to the competition draft to enable the user to access the draft. Further, the fantasy sports system may provide links on the draft or other pages (e.g., in the form of other team names) to enable users to view rosters of those teams.

It is to be understood that the software for the computer systems of the present invention embodiments (e.g., server systems, etc.) may be implemented in any desired computer language and could be developed by one of ordinary skill in the computer arts based on the functional descriptions contained in the specification and flow diagrams illustrated in the drawings. In other words, the type of programs and programming languages are not restricted to the use of only the aforementioned. Further, any references herein of software performing various functions generally refer to computer systems or processors performing those functions under software control. The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the end-user and server systems. The software and/or algorithms described above and illustrated in the flow diagrams may be modified in any manner that accomplishes the functions described herein. In addition, the functions in the flow diagrams or description may be performed in any order that accomplishes a desired operation.

The software of the present invention embodiments (e.g., fantasy sports competition software, etc.) may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

From the foregoing description, it will be appreciated that the invention makes available a novel system and method for conducting a fantasy sports competition, wherein fantasy sports or other competitions are conducted by providing selection of new teams at the expiration of various time intervals (e.g., a week, a day, etc., and preferably less than the duration of a sports season), where users may selectively participate in free and fee based competitions to accumulate points and earn cash and/or merchandise type rewards.

Having described preferred embodiments of a new and improved system and method for conducting a fantasy sports competition, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of conducting a fantasy competition comprising:

(a) enrolling users within a fantasy competition at least partially coinciding with one or more actual events, wherein step (a) further includes:

(a.1) enrolling users within a playoff fantasy competition at least partially coinciding with one or more actual playoff events;

(b) creating a team for each user enrolled in said fantasy competition by enabling each user to select members for an associated team, wherein enrolled users in a predetermined order select said members, and wherein step (b) further includes:

(b.1) creating a team for each user enrolled in said playoff fantasy competition by enabling said enrolled playoff users in a predetermined order to select members for associated playoff teams; and (c) determining and accumulating points for each enrolled user based on performances of said selected team members in corresponding actual events, wherein point values are assigned to specific activities within said actual events and awarded to said enrolled users for occurrences of those activities by a corresponding selected team member, wherein step (c) further includes:

(c.1) removing said selected members from said playoff teams in response to actual corresponding teams of said selected playoff team members being eliminated within said actual playoff events; and (c.2) determining and accumulating points for each user based on performances of remaining selected members on said playoff teams in said corresponding actual playoff events.

2. The method of claim 1, wherein step (c) further includes:

(c.3) removing at least one playoff team from said playoff fantasy competition based on said accumulated points after a recurring predetermined time interval.

3. The method of claim 1, wherein said fantasy competitions accommodates a predetermined quantity of users, and step (a) further includes:

creating at least one virtual participant in response to a quantity of enrolled users being less than said predetermined quantity of users;

wherein step (b) further includes:

(b.1) creating a team for each virtual participant by selecting members for those teams;

wherein step (c) further includes:

(c.1) determining points for each virtual participant based on performances of said selected team members in corresponding actual events.

4. The method of claim 1, further including:

(d) enabling users to associate and communicate with each other and share information by:

creating and posting information viewable by other users, wherein said information includes a user profile and/or a blog;

creating links between users to user information;

transferring messages; and/or creating and maintaining a message board including at least one topic.

5. The method of claim 4, wherein said creating links between users includes:

sending a request to a first user to be associated with a second user;

enabling said first user to accept or decline said request; and linking said first and second users together and providing links between information of said first and second users.

6. The method of claim 4, wherein said creating links between users includes:

searching for users to associate with based on one or more search criteria.

7. The method of claim 1, wherein said actual events include one or more sporting events and said selected team members include participants of said sporting events.

8. A program product apparatus comprising:

a computer useable memory device with computer program logic recorded thereon for conducting a fantasy competition, said computer useable memory device including:

a join module to enroll users within a fantasy competition at least partially coinciding with one or more actual events, wherein said join module includes:

a playoff module to enroll users within a playoff fantasy competition at least partially coinciding with one or more actual playoff events;

a draft module to create a team for each user enrolled in said fantasy competition by enabling each user to select members for an associated team, wherein said draft module enables users in a predetermined order to select said members, and wherein said draft module further includes:

a playoff draft module to create a team for each user enrolled in said playoff fantasy competition by enabling said enrolled playoff users in a predetermined order to select members for associated playoff teams; and a points module to determine and accumulate points for each enrolled user based on performances of said selected team members in corresponding actual events, wherein point values are assigned to specific activities with said actual events and awarded to said enrolled users for occurrences of those activities by a corresponding selected team member, and wherein said points module further includes:

a member module to remove said selected members from said playoff teams in response to actual corresponding teams of said selected playoff team members being eliminated within said actual playoff events; and a playoff points module to determine and accumulate points for each user based on performances of remaining selected members on said playoff teams in said corresponding actual playoff events.

9. The apparatus of claim 8, wherein said fantasy competitions accommodates a predetermined quantity of users, and said join module further includes:

a virtual module to create at least one virtual participant in response to a quantity of enrolled users being less than said predetermined quantity of users; and wherein said draft module further includes:

a virtual draft module to create a team for each virtual participant by selecting members for those teams;

wherein said points module further includes:

a virtual points module to determine points for each virtual participant based on performances of said selected team members in corresponding actual events.

10. The apparatus of claim 8, further including:

a social network module to enable users to associate and communicate with each other and share information.

11. The apparatus of claim 8, wherein said actual events include one or more sporting events and said selected team members include participants of said sporting events.

12. A system for conducting a fantasy competition comprising:

a computer system to conduct a fantasy competition among users including:

a join module to enroll users within a fantasy competition at least partially coinciding with one or more actual events, wherein said join module includes:

a playoff module to enroll users within a playoff fantasy competition at least partially coinciding with one or more actual playoff events;

a draft module to create a team for each user enrolled in said fantasy competition by enabling each user to select members for an associated team, wherein said draft module enables enrolled users in a predetermined order to select said members, and wherein said draft module further includes:

a playoff draft module to create a team for each user enrolled in said playoff fantasy competition by enabling said enrolled playoff users in a predetermined order to select members for associated playoff teams; and a points module to determine and accumulate points for each enrolled user based on performances of said selected team members in corresponding actual events, wherein point values are assigned to specific activities within said actual events and awarded to said enrolled users for occurrences of those activities by a corresponding selected team member, wherein said points module further includes:

a member module to remove said selected members from said playoff teams in response to actual corresponding teams of said selected playoff team members being eliminated within said actual playoff events; and a playoff points module to determine and accumulate points for each user based on performances of remaining selected members on said playoff teams in said corresponding actual playoff events.

13. The system of claim 12, wherein said computer system further includes:

a prize module to determine one or more enrolled users to receive prizes based on said accumulated points and to enable users to selectively redeem said accumulated points for items based on point values assigned to those items.

14. The method of claim 1, wherein step (a) further includes:

enrolling users within a fee based competition associated with an entry fee or a free competition without an entry fee, wherein said fee based and free competitions each include open competitions available to each user and private competitions available to particular users.

15. The method of claim 14, wherein step (a) further includes:

receiving information pertaining to selected users for said private fantasy competition;

sending an invitation to each of said selected users to join said private fantasy competition;

enabling each of said selected users to accept or decline said invitation; and enrolling each selected user accepting said invitation within said private fantasy competition.

16. The method of claim 1, further including:

(d) determining one or more enrolled users to receive prizes based on said accumulated points and to enable users to selectively redeem said accumulated points for items based on point values assigned to those items.

17. The method of claim 16, wherein step (d) further includes:

(d.1) offering items, each associated with a point value, to users and enabling said users to redeem accumulated points for said items, wherein said redeemed points are removed from said accumulated points for future point redemptions.

18. The apparatus of claim 8, wherein said join module includes:

an enroll module to enroll users within a fee based competition associated with an entry fee or a free competition without an entry fee, wherein said free and fee based competitions each include open competitions available to each user and private competitions available to particular users.

19. The apparatus of claim 18, wherein said join module includes:

a member module to receive information pertaining to selected users for said private fantasy competition;

an invitation module to send an invitation to each of said selected users to join said private fantasy competition;

a response module to enable each of said selected users to accept or decline said invitation; and an accept module to enroll each selected user accepting said invitation within said private fantasy competition.

20. The apparatus of claim 8, wherein the computer useable memory device further includes:

a prize module to determine one or more enrolled users to receive prizes based on said accumulated points and to enable users to selectively redeem said accumulated points for items based on point values assigned to those items.

21. The apparatus of claim 8, wherein said playoff points module further includes:

a team module to remove at least one playoff team from said playoff fantasy competition based on said accumulated points after a recurring predetermined time interval.

22. The system of claim 12, wherein said join module includes:

a private join module to enroll users within a private fantasy competition available to particular users of said system.

23. The system of claim 12, wherein said join module includes:

an enroll module to enroll users within a fee based competition associated with an entry fee or a free competition without an entry fee.

24. The system of claim 12, wherein said join module includes:

an open join module to enroll users within an open fantasy competition available to each user of said system.

25. The system of claim 22, wherein said private join module includes:

a member module to receive information pertaining to selected users for said private fantasy competition;

an invitation module to send an invitation to each of said selected users to join said private fantasy competition;

a response module to enable each of said selected users to accept or decline said invitation; and an accept module to enroll each selected user accepting said invitation within said private fantasy competition.

26. The system of claim 13, wherein said prize module includes:

a redemption module to offer items, each associated with a point value, to users and to enable said users to redeem accumulated points for said items, wherein said redeemed points are removed from said accumulated points for future point redemptions.

27. The system of claim 12, wherein said playoff points module further includes:

a team module to remove at least one playoff team from said playoff fantasy competition based on said accumulated points after a recurring predetermined time interval.

28. The system of claim 12, wherein said fantasy competition accommodates a predetermined quantity of users, and said join module further includes:

a virtual module to create at least one virtual participant in response to a quantity of enrolled users being less than said predetermined quantity of users;

wherein said draft module further includes:

a virtual draft module to create a team for each virtual participant by selecting members for those teams;

wherein said points module further includes:

a virtual points module to determine points for each virtual participant based on performances of said selected team members in corresponding actual events.

29. The system of claim 12, further including:

a social network module to enable users to associate and communicate with each other and share information.

30. The system of claim 29, wherein said social network module includes:

an information module to enable users to create and post information viewable by other users within said system, wherein said information includes a user profile and/or a blog.

31. The system of claim 29, wherein said social network module includes:

an association module to enable association of users by creating links between users to user information.

32. The system of claim 31, wherein said association module includes:

a request module to send a request to a first user to be associated with a second user;

a response module to enable said first user to accept or decline said request; and a link module to link said first and second users together and provide links between information of said first and second users.

33. The system of claim 31, wherein said association module includes:

a search module to search for users to associate with based on one or more search criteria.

34. The system of claim 29, wherein said social network module includes:

a communications module to enable communications among users by transferring messages and/or creating and maintaining a message board including at least one topic.

35. The system of claim 12, wherein said actual events include one or more sporting events and said selected team members include participants of said sporting events.

* * * * *